United States Patent [19]

Pocrass

[11] Patent Number: 5,428,806
[45] Date of Patent: Jun. 27, 1995

[54] COMPUTER NETWORKING SYSTEM INCLUDING CENTRAL CHASSIS WITH PROCESSOR AND INPUT/OUTPUT MODULES, REMOTE TRANSCEIVERS, AND COMMUNICATION LINKS BETWEEN THE TRANSCEIVERS AND INPUT/OUTPUT MODULES

[76] Inventor: Alan L. Pocrass, 41 Golden Glen, Simi Valley, Calif. 93065

[21] Appl. No.: 8,008

[22] Filed: Jan. 22, 1993

[51] Int. Cl.$^6$ .............................................. G06F 15/00
[52] U.S. Cl. ..................................... 395/800; 395/200;
364/242.94; 364/929.5; 364/931.4; 364/940.61;
364/DIG. 2
[58] Field of Search .................. 395/800, 200, 275;
370/94.2, 95.2, 95.3, 85.6; 358/86; 364/242.94,
929.5, 931.4, 940.61, DIG. 2

[56] References Cited

U.S. PATENT DOCUMENTS

| | | | |
|---|---|---|---|
| 4,787,031 | 11/1988 | Karger et al. | 395/800 |
| 5,058,110 | 10/1991 | Beach et al. | 370/85.6 |
| 5,062,059 | 10/1991 | Youngblood et al. | 395/275 |
| 5,113,496 | 5/1992 | McCalley et al. | 395/200 |
| 5,124,982 | 6/1992 | Kaku | 370/85.3 |
| 5,226,120 | 7/1993 | Brown et al. | 395/200 |
| 5,274,767 | 12/1993 | Maskovyak | 395/275 |

Primary Examiner—Alyssa H. Bowler
Assistant Examiner—John Harrity
Attorney, Agent, or Firm—Webb Ziesenheim Bruening Logsdon Orkin & Hanson

[57] ABSTRACT

A computer networking system includes a plurality of computer processing modules and at least one I/O module connected together through a backplane in a chassis at a central location. Users at variou remote locations connect at least a keyboard and a monitor to a transceiver unit. A data communication link is established between each transceiver and a unit interface on an I/O module. Data flow between the processor modules and the transceivers, as well as an allocation of processing module resources, are controlled by the I/O modules. The processor modules are connected together through at least one high speed network bus in the backplane.

20 Claims, 16 Drawing Sheets

COMPUTER NETWORKING SYSTEM INCLUDING CENTRAL CHASSIS WITH PROCESSOR AND INPUT/OUTPUT MODULES, REMOTE TRANSCEIVERS, AND COMMUNICATION LINKS BETWEEN THE TRANSCEIVERS AND INPUT/OUTPUT MODULES

BACKGROUND OF THE INVENTION

1. Field of the Invention

This invention relates to computer systems and, more particularly, to computer systems which share data information and processing capabilities.

2. Background of the Invention

Before the development and widespread use of the personal computer, users would typically tap into a large mainframe computer through a terminal, such as a keyboard alone or with a monitor or other visual display, at the user's location. Such an arrangement gave a user the processing capabilities and data sharing of the powerful mainframe computer, and multiple users could access the mainframe through time-sharing or other arrangements. However, the user had little or no control over the application software included in the mainframe computer and the expense involved in purchasing a mainframe computer was prohibitive to all but the larger corporations.

With the advent of the personal computer, powerful computing capabilities have been brought to a user's desk. Many users of large mainframe computers have decided to decentralize their large machines for smaller desktop computers used as workstations. However, standalone personal computers have a drawback in that data cannot be shared and application programs residing in other personal computers in an organization or elsewhere cannot be utilized without additional modifications. The desire to communicate and share information with other users led to the development of personal computer networks.

Existing local area networks (LAN) interconnect a variety of workstations over a common cabling system. This enables the workstations to communicate with each other and to share access to computing resources, such as mainframe or other databases, laser printers and file servers. Transmission of information on the LAN to and from these devices, and to other workstations, is governed by a network interface card or logic embedded within the computer workstation, and attached to the LAN. These workstations are interconnected by communication concentrators, typically located at a centralized location. In addition, a typical prior art LAN requires a file server or other mechanism for controlling the operation of the LAN and data flowing therein. To function properly, the connecting devices of the LAN must obey rules or protocols that govern access to and communications with the network. Some of the communication protocols which have been developed include the Ethernet, Token Ring, Appletalk, Fiber Distributed Data Interface (FDDI) and ARCNET serial bus networks, and the VME, Multibus and Futurebus parallel bus networks.

In addition to the various network protocols, users may employ different cabling media, such as twisted wire cables, fiber optics, phone lines and infrared light and radio signals, to connect the workstations to the network. A user may find it necessary to use an external transceiver unit to convert a network interface card to a different cabling medium in order to provide physical access to the network.

These prior art networks, while functioning adequately for many applications, do have several drawbacks. Initially, each user or user location must include a computer processing unit along with, at least, a keyboard and monitor to supply the computing capabilities to the user and provide access to the network. In addition, expensive network cabling media must extend from user to user along the network. Typically, this expensive cabling media extends over great distances as users are located physically in widely separated areas. The use of separate processing units at each user's location, as well as the expensive and lengthy cabling media, renders typical computer networks rather expensive. In addition, the length of the network cabling media limits the speed at which the network can be operated.

It is, accordingly, an object of the present invention to provide a computer networking arrangement which includes the processing and data sharing capabilities of prior networks, but which is faster in operation and includes fewer computer processors per user location than prior systems.

It is a further object to provide such a computer network in a system which is easy to configure and operate, is readily modifiable for different network requirements, and can be easily changed to accommodate the rapid changes in network protocols, computer processing capabilities and the like.

SUMMARY OF THE INVENTION

Accordingly, I have developed a computer networking system which includes a chassis positioned at a central location and adapted to receive a plurality of electronic modules. The chassis includes a backplane formed of a plurality of electronic module receiving slots, each including a plurality of conductive contacts and electrical connections between associated conductive contacts in each slot. The electrical connections in the backplane include a plurality of data lines and at least one processor network line. The present invention also includes at least two processor modules attached to the chassis and connected to the conductive contacts in separate of the backplane slots. The processor modules each include at least one computer processor, at least one backplane interface between the computer processor and the backplane data lines, and a network interface/controller connected between the computer processor and the processor network line in the backplane. The computer processor includes means for receiving uplink data streams from certain of the backplane data lines through the backplane interface and means for generating downlink data streams and downlink video data streams which are supplied to other of the backplane data lines through the backplane interface.

The present invention also includes at least one input/output or I/O module attached to the chassis and connected to the conductive contacts in another of the backplane slots. The I/O module includes a plurality of channel interfaces, means for determining the availability of a processor module backplane interface, and means for selectively connecting a particular channel interface to the backplane data lines associated with an available processor module backplane interface and directing the flow of the downlink data, downlink video data and uplink data streams between the processor module and a particular I/O module channel interface through data paths over the selected backplane data lines. The invention also includes a plurality of transceivers positioned at various locations remote from the chassis. Each transceiver includes a plurality of I/O ports adapted to be connected to various peripheral devices, and including at least a keyboard port and a video monitor port. Each transceiver includes means for directing a downlink video data stream from an I/O connection in the transceiver to the monitor port, and means for directing downlink data and uplink data streams between the transceiver I/O connection and appropriate of the I/O ports in the transceiver.

In addition, this invention includes communication links extending from the I/O connection of each transceiver to a unique channel interface in the I/O module for transmitting the uplink data, downlink data and downlink video data streams between the I/O module and the transceivers. The downlink video data streams each include certain signals developed by a processor module for generating screen displays in a video monitor. The downlink data streams each include certain signals developed by a processor module for the various I/O ports of a transceiver other than the signals in the downlink video data streams. The uplink data streams each include the incoming signals developed by peripheral devices connected to a transceiver. The I/O module includes means for maintaining the selected data paths over the backplane from an active transceiver to an available processor module backplane interface and for closing the selected data paths when the transceiver becomes inactive.

The system can also include a plurality of processor network lines in the backplane. Each processor module would include separate network interface/controllers connected between the computer processor and separate of the processor network lines in the backplane. Each processor module can also include a plurality of backplane interfaces between the computer processor and the backplane data lines and, thereby, permit more than one user to utilize the computer processing capabilities of a particular processor module. Each processor module can also include selection means for selectively connecting each of the uplink data, downlink data and downlink video data streams in each backplane interface to a separate one of a predetermined plurality of backplane data lines. The backplane can also include means for generating a slot identification signal unique to each backplane slot. This slot identification signal is supplied to a processor module connected to a particular slot and is used by the selection means.

A plurality of I/O modules can be attached to the chassis and connected to the conductive contacts in separate of the backplane slots. In addition, the electrical connections in the backplane can include at least one I/O module network line. Each I/O module would then include a network interface/controller connected between the I/O module and the I/O module network line, thereby enabling each I/O module to have access to all backplane interfaces and all processor modules attached to the chassis. The I/O module can also include an external network connection which permits external access at the chassis to the I/O module network line.

In a preferred embodiment, the downlink video data stream is an encoded, multiplexed serial data stream carried over a video data communication link between a transceiver I/O connection and an I/O module channel interface. In addition, the uplink data and downlink data streams are each preferably encoded, multiplexed serial data streams carried over a shared data communication link between a transceiver I/O connection and an I/O module channel interface. In this arrangement, the transceiver would include means for multiplexing and encoding the uplink data streams, and means for demultiplexing and decoding the downlink data and downlink video data streams. In addition, the processor module would include means for multiplexing and encoding the downlink data and downlink video data streams, and means for demultiplexing and decoding the uplink data streams. The demultiplexing and decoding means and the multiplexing and encoding means for the processor module are preferably located in each backplane interface. In a preferred arrangement, the data streams are serialized by a time division multiplexing arrangement and are encoded by a Manchester data encoding arrangement.

The communication links between the I/O module and the transceivers can be provided by a wide variety of known communication links, such as fiber optic cables, coaxial cables, shielded twisted pair cables, and unshielded twisted pair cables, in addition to wireless transmissions and associated interfaces. In addition, the computer networking system of this invention can include power means associated with the backplane for supplying electrical power through each slot to a module connected thereto. The power means can include separate power lines extending in the backplane from a power source on the chassis to a particular conductive contact in each slot.

In order to provide a processor module with standalone capabilities or direct access, the processor module can include an external network connection which permits external access at the chassis to one of the processor network lines. In addition, the processor module can further include an external data connection which permits external access at the chassis to an uplink data stream, a downlink data stream and a downlink video data stream in one of the backplane interfaces. In addition, the processor module can further include a plurality of external I/O connections which permit peripheral devices to be connected at the chassis to a processor module through one of the backplane interfaces.

DETAILED DESCRIPTION OF THE PREFERRED EMBODIMENT

Figure 1:
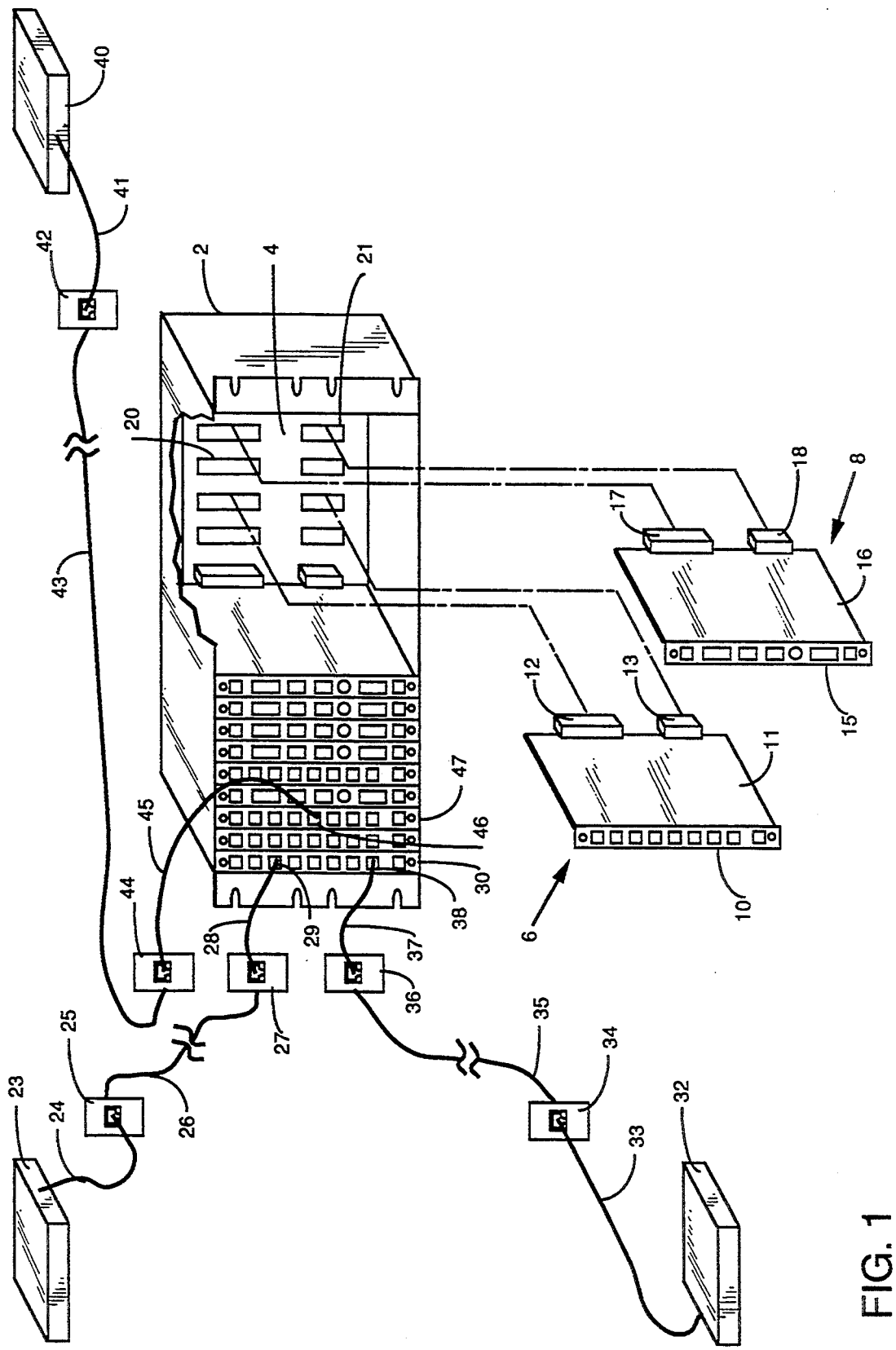
FIG. 1 is a perspective view, partially exploded, of one embodiment of a computer networking system in accordance with the present invention.

FIG. 1 shows one embodiment of a computer networking system in accordance with the present invention. This invention shows the elements of one embodiment of the present invention, but does not show the various peripheral devices, such as a keyboard or a monitor, which would be connected to the present invention by a user. The invention includes a chassis 2, typically mounted in a rack and located at a centralized location, which carries a plurality of electronic modules plugged into slots in a backplane 4 at the interior of the chassis 2. The system includes one or more input/output or I/O modules 6 connected to the backplane 4 as well as one or more CPU or processor modules 8 connected to the backplane 4. Each of the I/O modules 6 and processor modules 8 include a front panel, a printed circuit board carrying the electronic components of the module, and a connector means along one edge of the printed circuit board opposite of the front panel. Although various connection means can be used, in the embodiment shown in FIG. 1, each of the I/O modules 6 and processor modules 8 carry a pair of male connectors which engage corresponding female connectors in a slot on the backplane 4. In particular, each I/O module 6 includes front panel 10, printed circuit board 11, 144 pin male connector 12 and 48 pin male connector 13. Each processor module 8 includes front panel 15, printed circuit board 16, 144 pin male connector 17 and 48 pin male connector 18. The backplane 4 carries pairs of 144 pin female connectors 20 and 48 pin female connectors 21 which are arranged in multiple slots across the interior of the chassis 2 so that the corresponding male connectors on the I/O modules 6 and processor modules 8 are aligned therewith and engage the female connectors when the respective modules are positioned within the slots in the chassis 2.

As will be explained hereinafter in more detail, each conductive contact or pin in a 144 pin female connector 20 in the backplane 4 is wired together with associated conductive contacts in the other 144 pin female connectors 20 in the backplane 4. Similarly, each conductive contact in a 48 pin female connector 21 in the backplane 4 is wired together with associated conductive contacts in the other 48 pin female connectors 21 in the backplane 4. This arrangement enables data and other information to flow between the various modules positioned within the chassis 2. While FIG. 1 shows a particular number of I/O modules 6 and processor modules 8 arranged in particular slot locations within the chassis 2, and a particular number of module receiving locations or slots on the backplane 4 within the chassis 2, it is to be understood that the chassis 2 can be provided with fewer or more slots, that all or a portion of the slots can be occupied by modules, and that any number of I/O modules 6 or processor modules 8 can be utilized, provided that at least one I/O module 6 and two processor modules 8 are included.

A transceiver is positioned at a location for each user which is physically remote from the chassis 2. A data transmission path or communication link is provided between each transceiver and an appropriate channel interface or I/O port on one of the I/O modules 6. The arrangement shown in FIG. 1 is specific to an arrangement in which the transceivers are connected to the I/O modules 6 by standard, 4-conductor, unshielded twisted pair cables, otherwise referred to as telephone wire. It is also preferred that the connections be easily changed and, therefore, standard RJ45 connectors are provided at the various contact points. Although this arrangement is shown with the use of unshielded twisted pair conductors, it is to be understood that other conduction means, such as shielded twisted pair cables, fiber optic cables, coaxial cables and, even, infrared, radio or other wireless signal transmissions, can be used. These modifications merely require a modification in the data receiving and transmission ports on the transceiver and the I/O module 6.

As will be explained hereinafter in more detail, each I/O module 6 has a plurality of RJ45 connectors or other appropriate connectors on its front panel 10, which serve as channel interfaces or I/O connections or ports to the I/O module 6. In a typical arrangement, a cable extends from a transceiver to an RJ45 connector at a first wall unit adjacent the remote location. A second cable extends from the first wall unit to a second wall unit adjacent the chassis 2 and the I/O modules 6. A third cable extends from an RJ45 connector in the second wall unit to one of the RJ45 connectors on the front panel 10 of one of the I/O modules 6. In the present invention, it is not important which I/O module 6 is used for a particular transceiver; however, each transceiver will be connected to only one channel interface on an I/O module 6 and no other transceiver will be connected to that channel interface on that particular I/O module 6.

For clarity sake, FIG. 1 shows three transceivers connected to I/O modules. However, it is to be understood that more transceivers could be connected to the computer networking system shown in FIG. 1. As shown in FIG. 1, transceiver 23 is connected via cable 24 to wall unit 25, via cable 26 to wall unit 27, and via cable 28 to RJ45 connector 29 on I/O module 30. Similarly, transceiver 32 is connected via cable 33 to wall unit 34, via cable 35 to wall unit 36, and via cable 37 to RJ45 connector 38 on I/O module 30. Finally, transceiver 40 is connected via cable 41 to wall unit 42, via cable 43 to wall unit 44, and via cable 45 to RJ45 connector 46 on I/O module 47, an I/O module different than that to which cables 28 and 37 were connected.

Figure 2A:
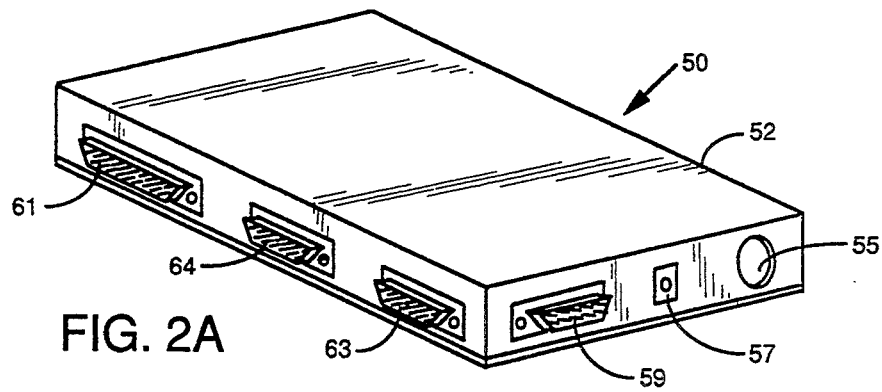
FIG. 2A is a perspective view, from one direction, of a transceiver used in the system shown in FIG. 1.
Figure 2B:
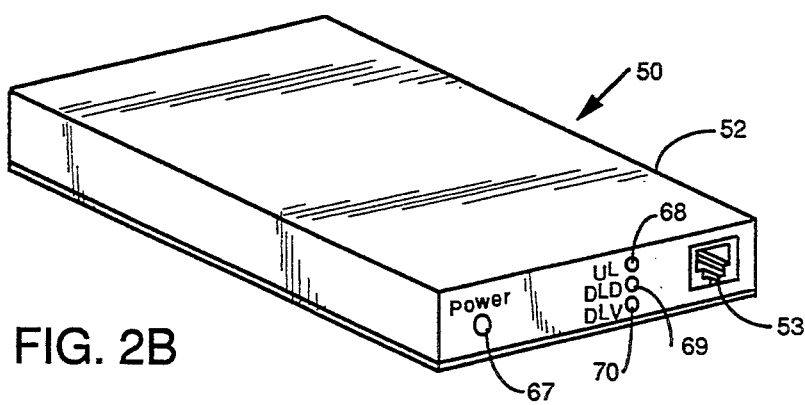
FIG. 2B is a perspective view, from an opposite direction, of the/transceiver shown in FIG. 2A.
Figure 3:
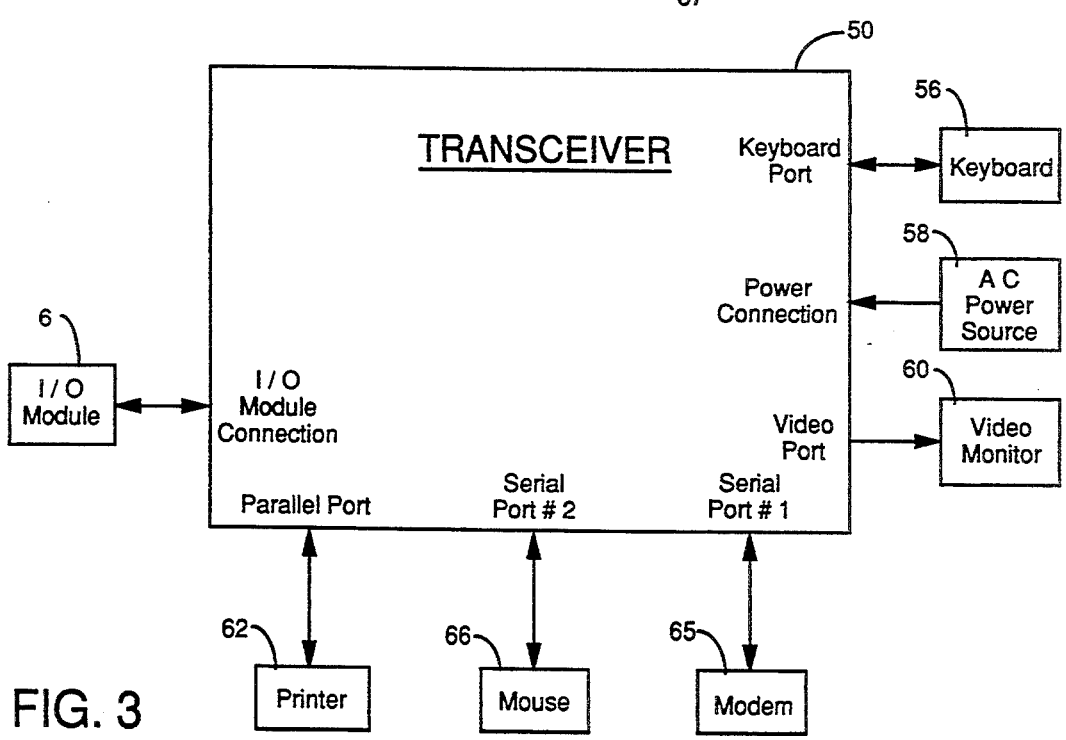
FIG. 3 is a block diagram showing the transceiver of FIGS. 2A and 2B connected to various peripheral devices.

One embodiment of a transceiver 50 usable with the present invention, and arranged for sending and receiving data over an unshielded twisted pair cable, is shown in FIGS. 2A, 2B and 3. The transceiver 50 includes various electronic components contained within a housing 52 and external connections, serving as ports, arranged around the exterior of the housing 52. Standard connectors are used for the various ports so that common peripheral units can be connected to the transceiver 50 in the standard manner. An RJ45 connector 53 in the transceiver 50 serves as an I/O module connection and enables the transceiver 50 to be connected to an I/O module 6 as discussed above in connection with FIG. 1. A six-pin circular connector 55 serves as a keyboard port for connecting the transceiver 50 to a standard keyboard 56. A power connection 57 enables the transceiver 50 to receive power from an AC power source 58. A DB15 connector 59 serves as a video port and enables the transceiver 50 to be connected to a video monitor 60. A DB25 connector 61 serves as a parallel port and enables the transceiver 50 to be connected to a printer 62 or other parallel peripheral device. A pair of DB9 connectors 63 and 64 serve as serial ports #1 and #2 and enable the transceiver 50 to be connected to a variety of serial peripheral devices, such as the modem 65 connected to serial port #1 and the mouse 66 connected to serial port #2 as shown in FIG. 3. The transceiver 50 can also include light emitting diode (LED) 67 which indicates that AC power is being supplied to the transceiver 50. In addition, the transceiver 50 can have a plurality of LEDs 68, 69 and 70, which indicate the presence of an uplink data stream ("UL"), a downlink data stream ("DLD") and a downlink video data stream ("DLV"), respectively, in the transceiver 50.

Figure 4:
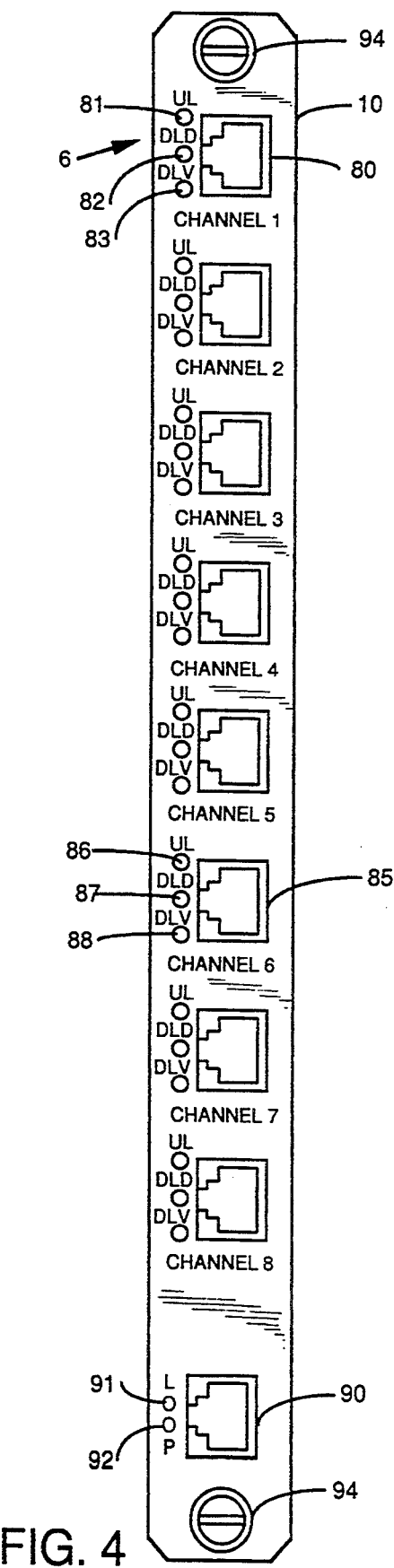
FIG. 4 is a front view of the front panel of an I/O module show in FIG. 1.

FIG. 4 shows a detailed view of the front panel 10 of the I/O module 6 shown in FIG. 1. Since I/O module 6 is designed to receive and transmit data over unshielded twisted pair cables, the front panel 10 carries a plurality of RJ45 connectors which each function as a channel interface and receive appropriate cabling from a particular transceiver. In addition, each RJ45 connector includes front panel mounted LEDs for indicating the presence of uplink data streams, downlink data streams and downlink video data streams in the I/O module 6 at a particular channel interface. For example, the front panel 10 of the I/O module 6 includes RJ45 connector 80 for channel 1 and LEDs 81, 82 and 83 to indicate the presence of uplink data, downlink data and downlink video data streams, respectively, in I/O module channel 1. Similarly, the front panel 10 of the I/O module 6 includes RJ45 connector 85 for channel 6 and LEDs 86, 87 and 88 to indicate the presence of uplink data, downlink data, and downlink video data streams, respectively, in I/O module channel 6. Each remaining channel on the I/O module 6 has an RJ45 connector and associated LEDs. Although the I/O module 6 in FIG. 4 shows eight such channels, which represent the possibility of eight different transceivers being connected thereto, it is to be understood that channel interfaces greater or less than eight can be included in a particular I/O module 6. As will be explained hereinafter in more detail, the I/O module 6 includes an additional RJ45 connector 90 on the front panel 10 which permits external access to an I/O module network in the system. This I/O module network RJ45 connector 90 includes LED 91 ("L") and LED 92 ("#"P) which provide link and partition status indications, respectively, for the I/O module network. Mounting screws 94 securely fasten the I/O module 6 to the chassis 2.

Figure 5:
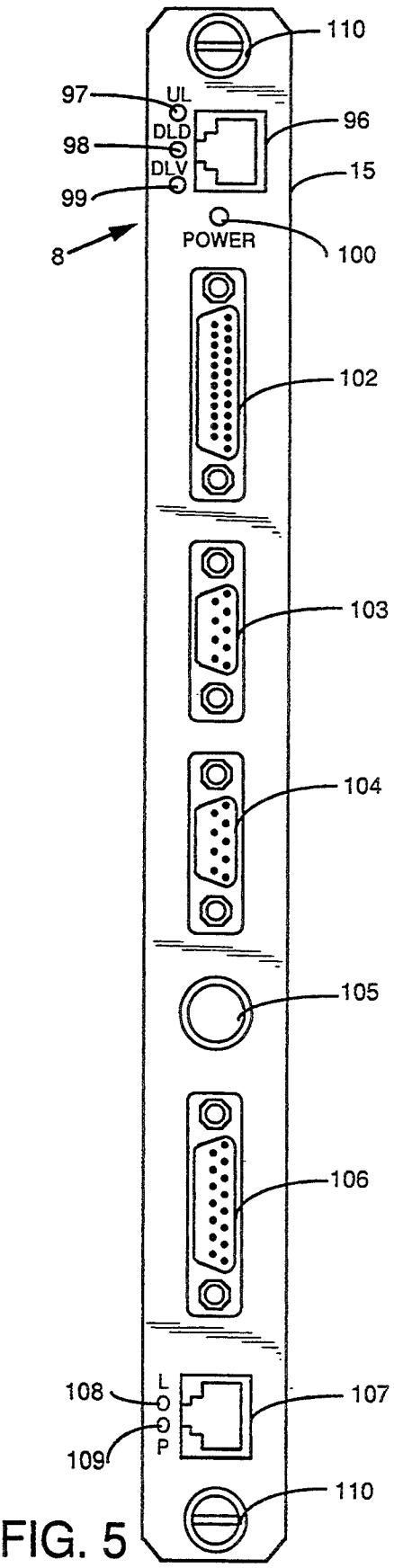
FIG. 5 is a front view of the front panel of a processor module shown in FIG. 1.

FIG. 5 shows a detailed view of the front panel 15 of the processor module 8 shown in FIG. 1. With the typical and primarily intended operation of the computer networking system of the present invention, none of the elements shown in the front panel 15 of the processor module 8 would be utilized. All of the normal computer processing, networking and data flow between the I/O modules 6 and the processor modules 8 and between the processor modules 8 themselves, are carried out through the backplane 4 and the connections at the rear of the modules. However, in order to increase the flexibility of the system and permit a processor module 8 to be used in an optional standalone configuration, and also to provide connections with the processor module 8 at the centralized location of the chassis 2, various connectors are provided on the front panel 15 of the processor module 8. As shown in FIG. 5, an RJ45 connector 96, with associated indicating LEDs 97, 98 and 99, is provided to tap into the uplink data, downlink data and downlink video data streams. LED 100 on the front panel 15 of the processor module 8 indicates that power is being supplied to the processor module 8 in its normal operation. In addition, the embodiment shown in FIG. 5 has, in turn, a DB25 connector 102 serving as a parallel port, a pair of DB9 connectors 103, 104 serving as serial ports #1 and #2, a six-pin circular connector 105 serving as a keyboard port, and a DB15 connector 106 serving as a monitor port. RJ45 connector 107, with associated link LED 108 and partition LED 109, permits external access to a processor network in the system. Mounting screws 110 securely fasten the processor module 8 to the chassis 2.

Figure 6A:
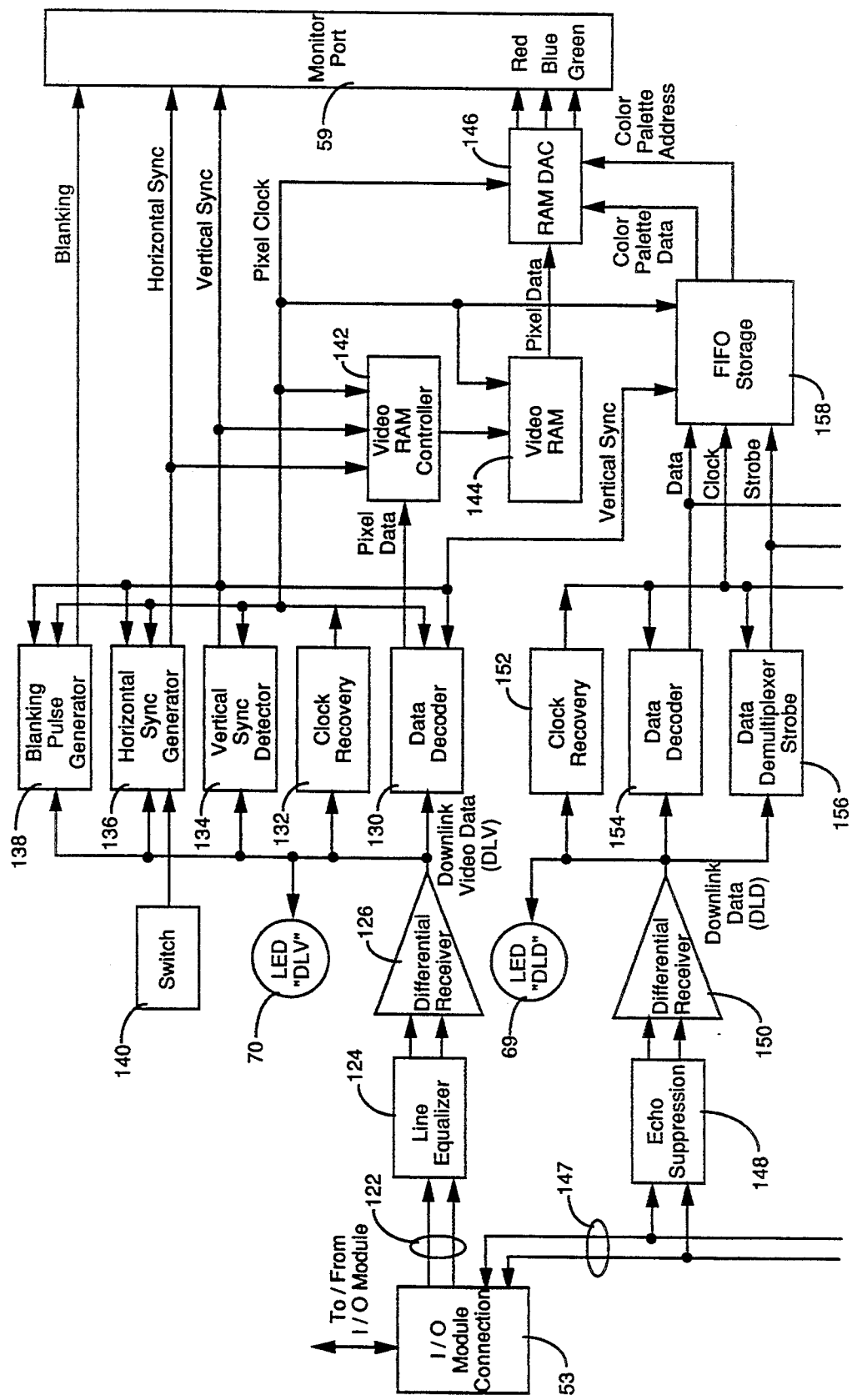
FIGS. 6A and 6B are block diagrams of the transceiver shown in FIGS. 1-3.
Figure 6B:
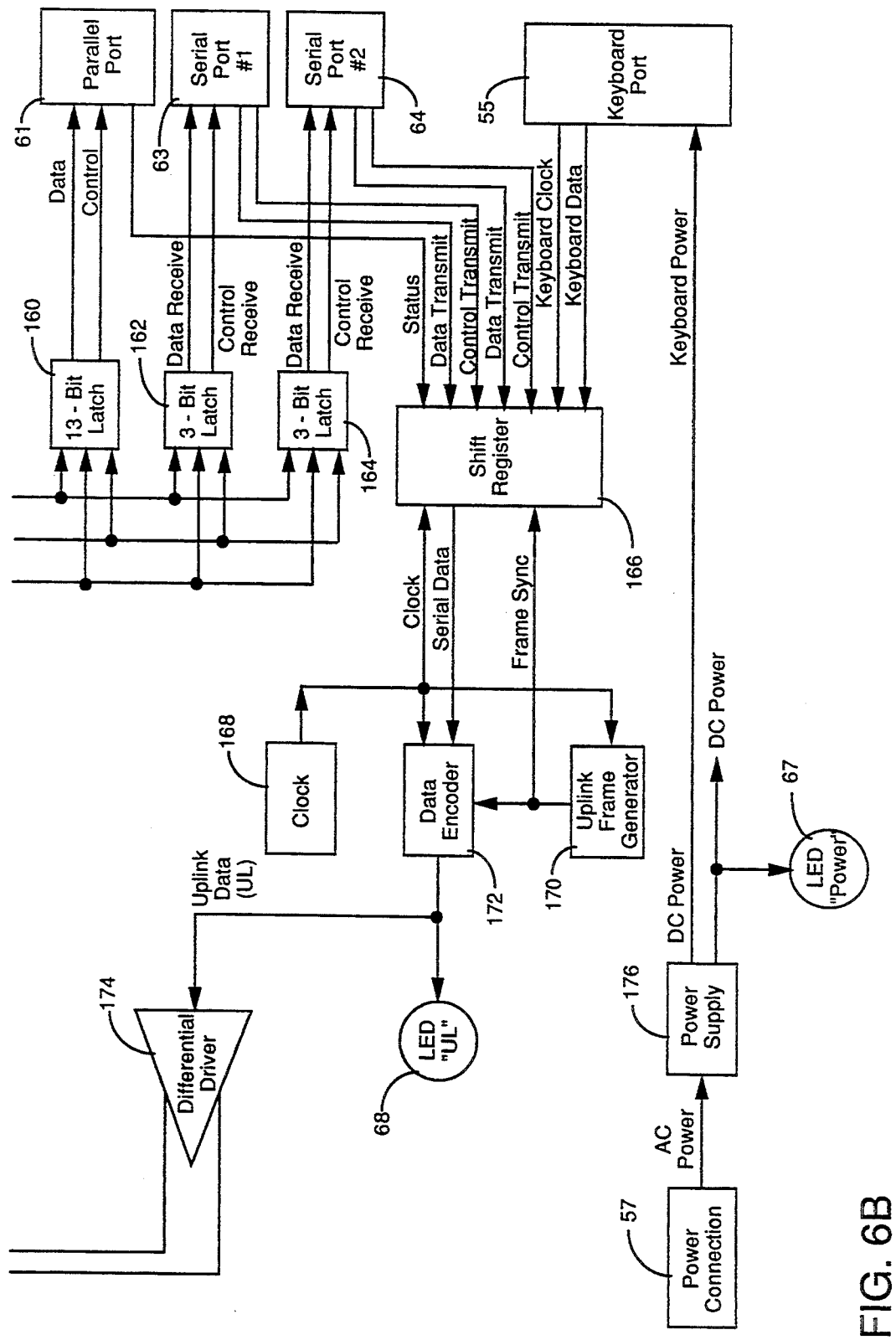

A block diagram of the elements and operation of the transceiver 50 shown in FIGS. 2A, 2B and 3 is set forth in FIGS. 6A and 6B. The unshielded twisted pair cable connecting the transceiver 50 from the I/O module connection to an I/O module 6 has four conductors. One pair of conductors is dedicated to carrying the downlink video data stream from an I/O module 6 to the transceiver 50. The other pair of conductors are shared and transmit the uplink data and downlink data streams between the transceiver 50 and an I/O module 6. In this embodiment, the data streams are each encoded and are transmitted in serial form and contain many pieces of information. The use of encoding and serial transmission enable a minimum number of conductors or communication links, here two pairs of conductors, to transmit the data streams. Therefore, a simple and inexpensive twisted pair telephone cable or the like can be used to connect the transceivers 50 and the I/O modules 6, typically over long distances. The transceiver 50 functions to extract the information from the data streams and supply it to an appropriate transceiver I/O port. In addition, the transceiver 50 takes the incoming data from the various incoming ports, generates an encoded and serial data stream and transmits this information back to an I/O module 6. The transceiver 50 can also function to supply the necessary power to a keyboard connected to the keyboard port 55.

With continued reference to FIGS. 6A and 6B, the downlink video data information created by a processor module 8 and sent to the transceiver 50 via an I/O module 6 is sent differentially over one pair of UTP or STP wires to the I/O module connection 53. In a preferred embodiment, this downlink video data is transmitted serially and in a Manchester encoded form, typically at 14,161 Mbps. An MLT3 encoding format or other encoding formats can also be used. The downlink video data stream includes the video information needed to generate the raster scans for the monitor display. The differential downlink video data signal is supplied from the I/O module connector 120 over cable pair 122 to line equalizer 124 which restores the pulse shape of the electrical signal and compensates for any degradation in the signal as it travelled over the cable from an I/O module 6 to the transceiver 50. Line equalizer 124 then supplies the restored differential signal to differential receiver 126 which detects the differential input of the incoming data and converts this data to a single-ended signal. The output of differential receiver 126 is supplied to, in turn, data decoder 130, clock recovery circuit 132, a vertical sync detector 134, a horizontal sync generator 136 and a blanking pulse generator 138. In addition, the output of differential receiver 126 is supplied to LED 70 discussed above.

Initially, clock recovery circuit 132 derives a pixel clock signal from the downlink video data stream and this clock signal is supplied, in turn, to data decoder 130, the vertical sync detector 134, the horizontal sync generator 136 and the blanking pulse generator 138. The clock signal is used to sample the downlink video data stream and identify the vertical sync pattern in the vertical sync detector 134. The vertical sync signal is then sent to one of the pins on the monitor port 59 as well as to data decoder 130, the horizontal sync generator 136 and the blanking pulse generator 138. The blanking pulse signal and the horizontal sync signal are generated in the blanking pulse generator 138 and horizontal sync generator 136, respectively, based on the recovered clock signal and the vertical sync signal. The generated blanking pulse and horizontal sync signals are then supplied directly to appropriate pins on the monitor port 59. Switch 140 connected to the horizontal sync generator 136 is an internal switch which can be used to change the number of horizontal lines displayed on a monitor. The normal setting is 480 horizontal lines for a VGA monitor, but switch 140 enables changes to be made for monitors that deviate from expected or normal configurations.

Data decoder 130, utilizing the vertical sync signal and the recovered clock signal, decodes the Manchester encoded downlink video data stream to base band video data. This converted data is also referred to as "pixel data". The pixel data from the data decoder 130 is supplied to a video Random Access Memory (RAM) controller 142, which also receives the horizontal sync signal, vertical sync signal and pixel clock signal. The video RAM controller 142 converts the serial pixel data into parallel 8-bit pixel data bytes and writes these data bytes into a particular location or address of a video RAM 144. The vertical sync signal is used to instruct the video RAM controller 142 as to where to write the first byte of a data frame into the video RAM 144. The video RAM 144 also receives the pixel clock signal. The video RAM 144 is a dual port dynamic RAM which stores the video data information and functions as a memory map of a monitor frame. The video RAM controller 142 uses the pixel clock to generate write addresses and write control pulses to refresh and write the parallel video data into the video RAM 144. The now parallel pixel data from the video RAM 144 is supplied to a RAM based Digital-to-Analog Converter 146 (RAM DAC) which converts the parallel video data output to three analog signals, namely, the red, blue and green analog signals used by the monitor. These three analog signals are supplied to the monitor port 59. The pixel clock signal is also supplied to the RAM DAC 146 for use in its operation.

The vertical sync detector 134 decodes a super frame pattern and frame sync pattern to generate the vertical frame sync signal for the monitor. The horizontal sync pulse generator 136 uses the vertical sync pulses as references to generate a predetermined number of horizontal pulses per vertical sync period. The setting of the switch 140 determines the rate of the horizontal pulses. The blanking pulse generator 138 expands the horizontal pulses and sends them to the monitor which uses the signal to blank out unwanted flickers on the monitor display.

The downlink data stream, carried over the other pair of wires in the cable connecting the I/O module to the I/O module connection 53 on the transceiver 50, is also sent differentially and in a serial and Manchester encoded data stream. The downlink data stream, carried by cable pair 147, is separated from the uplink data stream, carried over the same conductors, by echo suppression circuit 148 which filters out the signal of the uplink data stream. The downlink data stream is supplied from echo suppression circuit 148 to differential receiver 150 which, similar to differential receiver 126 discussed above, converts the differential downlink data stream to a single-ended signal for further processing in the transceiver 50. The single-ended data stream from differential receiver 150 is then supplied to clock recovery circuit 152, data decoder 154, and data demultiplexer strobe 156. In addition, the single-ended downlink data stream is supplied to LED 69 discussed above. Clock recovery circuit 152 extracts a clock signal from the Manchester encoded downlink data stream and distributes this clock signal to data decoder 154 and data demultiplexer strobe 156. Similar to the data decoder 130 above, data decoder 154 converts the incoming Manchester data stream into base band data.

Data demultiplexer strobe 156, using the clock signal and the incoming Manchester encoded data stream, generates a strobe signal which functions to load the decoded data stream into various data devices. In the arrangement shown in FIGS. 6A and 6B, a FIFO storage device 158 receives color palette information, including color palette data and color palette address, from the decoded data stream. A 13-bit latch 160 receives the parallel port data and parallel port control signals, 3-bit latch 162 receives the serial port #1 data receive and control receive signals, and 3-bit latch 164 receives the serial port #2 data receive and control receive signals. The clock signal from clock recovery circuit 152 is supplied additionally to the FIFO storage device 158, the 13-bit latch 160, 3-bit latch 162 and 3-bit latch 164. The strobe signal from data demultiplexer strobe 156 is supplied to the FIFO storage device 158, the 13-bit latch 160, 3-bit latch 162 and 3-bit latch 164. By predetermining the data stream arrangement of the various data, including the color palette information, the parallel port information, the serial port #1 information and the serial port #2 information, the clock and strobe signals will appropriately control the flow of data so that only the data relevant or appropriate to an associated port is placed into the FIFO storage device 158 or latches 160, 162 and 164.

In order to synchronize the color palette information, the vertical sync signal from vertical sync detector 134 and the pixel clock from clock recovery circuit 132 are each supplied to the FIFO storage device 158. The color palette data and color palette address signals are supplied from the FIFO storage device 158 to the RAM DAC 146 for appropriate modification of a particular red, blue and green color scheme as dictated by a processor module 8. The FIFO storage device 158 is a temporary storage device which temporarily stores the color palette information from a processor module 8 and writes this information into the RAM DAC 146 at an appropriate time as dictated by the vertical sync and the pixel clock signals.

The data and control signals are supplied from the 13-bit latch 160 to the parallel port 61. The data receive and control receive signals for the serial port #1 63 are supplied directly thereto from 3-bit latch 162. Similarly, the data receive and control receive signals for serial port #2 64 are supplied directly thereto from 3-bit latch 164.

In the arrangement shown in FIGS. 6A and 6B, the transceiver needs to collect data from four ports, namely, the parallel port 61, serial port #1 63, serial port #2 64 and the keyboard port 55, and perform a time division multiplexing operation on the data to transform this otherwise parallel data into a serial stream appropriate for Manchester encoding and transmission over shared cable pair 147. The status signal from the parallel port 61, the data transmit and control transmit signals from the serial port #1 63, the data transmit and control transmit signals from serial port #2 64, and the keyboard clock and keyboard data from the keyboard port 55 are supplied in parallel fashion to a shift register 166. Clock 168 supplies its control signal to an uplink frame generator 170, data encoder 172 and the shift register 166. The clock signal causes the shift register 166 to sample all data input to the shift register 166 at a rate preferably eight times the rate of the highest input data frequency. This sampling generates a serial data stream containing samples of all of the information supplied to the shift register 166. This serial data stream is supplied into data encoder 172 for Manchester encoding. An uplink frame generator 170, which has its frame sync output supplied both to data encoder 172 and to the shift register 166, inserts a frame sync signal into the uplink data stream at the beginning of each frame of information. In operation, the uplink frame generator 170 samples the input keyboard, parallel and serial data and stores the samples in the shift register 166. The samples are then shifted out at a predetermined rate into data encoder 172 which adds a frame sync signal and performs an appropriate Manchester encoding on the data stream. The encoded serial data stream is supplied from data encoder 172 to differential driver 174 which converts the single-ended data stream to a differential data stream. This differential data stream is supplied over cable pair 147 to the I/O module connection 53 which transmits the uplink data stream to an I/O module over the same pair of wires used to carry the downlink data stream. LED 68 is connected to the output of data encoder 172.

The power connection 57 on the housing 52 of the transceiver 50 carries AC power to a power supply 176 internal of the transceiver 50. This power supply 176 converts the AC power to DC power which is supplied to the keyboard port 55 as keyboard power for operation of a keyboard. In addition, the power supply 176 generates the DC power necessary to operate the various electronic elements in the transceiver. LED 67 is connected to a DC output of the power supply 176.

Figure 7:
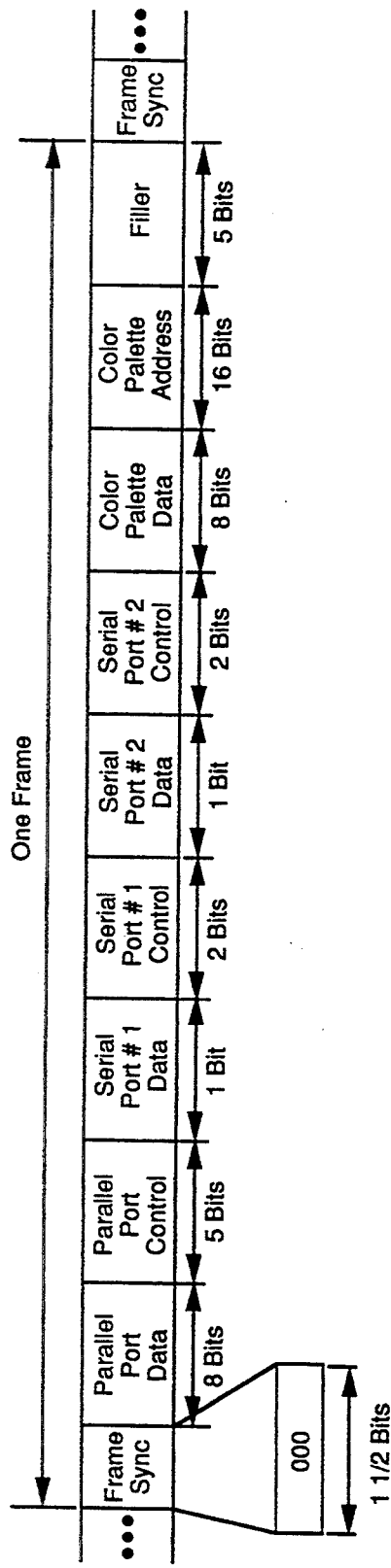
FIG. 7 is a block diagram of one frame of the downlink data stream passing through the transceiver shown in FIGS. 6A and B.

The particular sequence used for time division multiplexing of the uplink and downlink data streams is not important, provided that the system is set up to accommodate one particular arrangement throughout the system. One scheme for arranging a frame including the various data in the Manchester encoded downlink data stream is shown in FIG. 7. The frame will initially include a frame sync pattern. Here an initial frame sync pattern includes a stream of three zeros, which represent 1-½ bits of data time in the Manchester encoding scheme. The stream of three zeros is unique and would not occur during the Manchester encoding of data since a data frame in the Manchester encoding arrangement would never have three zeros in a row. Following the frame sync pattern, the downlink data stream includes, in order, eight bits of parallel port data, five bits of parallel port control, one bit of serial port #1 data, two bits of serial port #1 control, one bit of serial port #2 data, two bits of serial port #2 control, eight bits of color palette data, sixteen bits of color palette address, and five bits of filler. This sequence of data from and including the frame sync pattern defines one frame of the Manchester encoded downlink data stream.

Figure 8:
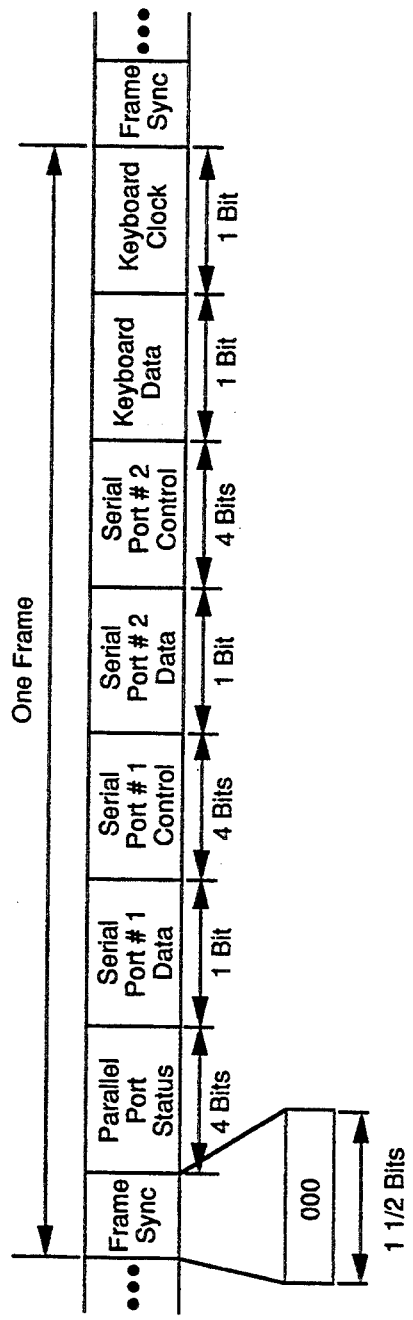
FIG. 8 is a block diagram of one frame of the uplink data stream passing through the transceiver shown in FIGS. 6A and 6B.

A similar arrangement is followed in each frame of the uplink data stream as shown in FIG. 8. An identical frame sync pattern, including three consecutive zeros forming 1-½ bits of data time in the Manchester encoding arrangement, is included at the beginning of a frame. The frame sync pattern is then followed by, in order, four bits of parallel port status, one bit of serial port #1 data, four bits of serial port #1 control, one bit of serial port #2 data, four bits of serial port #2 control, one bit of keyboard data and one bit of keyboard clock.

Figure 9:
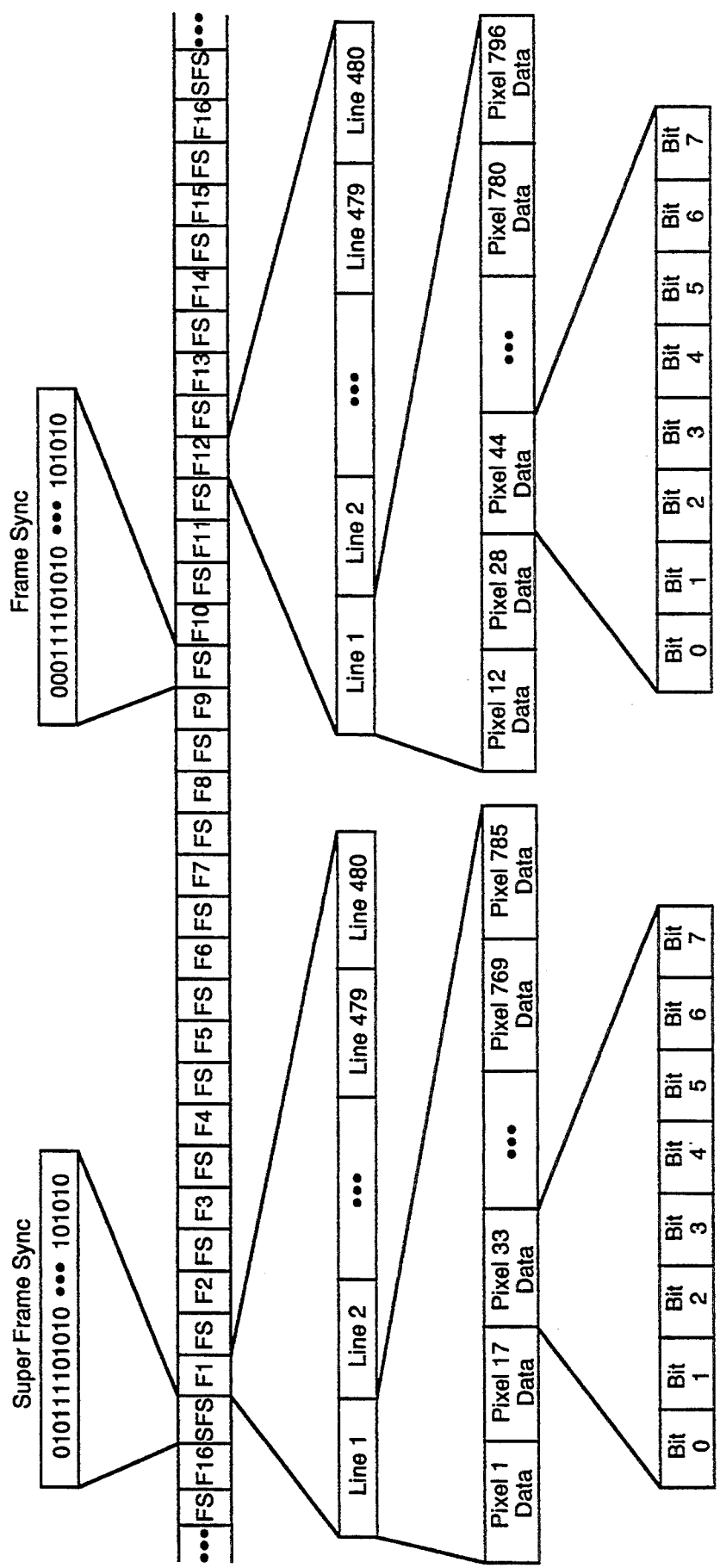
FIG. 9 is a block diagram of one super frame of the downlink video data stream passing through the transceiver shown in FIGS. 6A and 6B.

The downlink data video stream is shown in FIG. 9. The frame begins with a super frame synchronizing pattern, which starts at the monitor vertical sync time generated by the processor module 8 and lasts until the end of the vertical sync time. In the example shown in FIG. 9, which outlines an example for an 800 pixel×480 lines monitor display, the super frame sync pattern is 440 data bits long. The digital pattern is 010111101010. . ., 101010. This super frame sync pattern is followed by video data for every 16th pixel of every line of the video raster for the monitor display, starting with the first pixel of the top line. Each pixel is represented by eight bits of digital data. In order to lower the frequency of transmission of the downlink video data stream, each frame includes only 1/16 of the pixel information that would be necessary to make up a complete screen image. The downlink video data stream would need sixteen frames to make a complete screen image. Therefore, the information for the first frame, identified in FIG. 9 as F1 is followed by a frame sync pattern identified in the beginning of a regular frame. This frame sync pattern, as shown in FIG. 9, is 440 data bits long and is 000111101010 . . . , 101010. This process is repeated, alternating a frame sync pattern with a frame of the display, 16 times, sampling every 16th pixel data for each line. After the 16th frame has been sent, then a super frame sync pattern is sent indicating the beginning of another complete set of information to generate one complete screen image for the monitor. The video RAM 144 will store the transmitted information and create an entire screen after the data for all sixteen pixels has been received. This arrangement for lowering the frequency of transmission by sampling every 16th pixel for a frame will not noticeably reduce the quality of the image generated on the monitor display.

Figure 10:
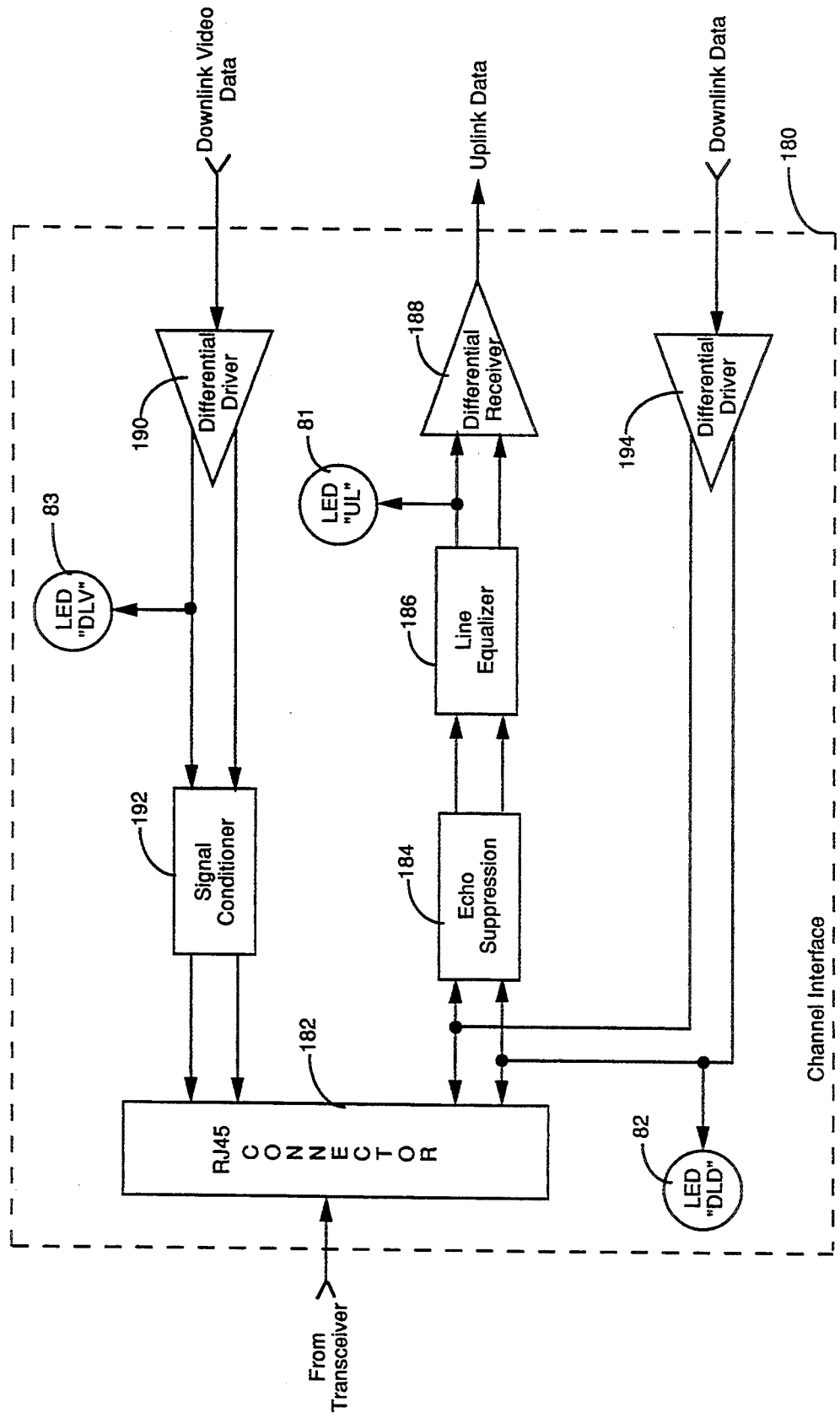
FIG. 10 is a block diagram of a channel interface used in he I/O module shown in FIG. 1.

FIG. 10 shows a block diagram of a channel interface 180 which forms a portion of the I/O module 6 shown in FIG. 1 above. One channel interface 180 is provided for each individual transceiver 50 to which an I/O module 6 is connected. The cable or other communication link carrying signals from a transceiver 50, here a 4-conductor, twisted pair cable, is connected to RJ45 connector 182 or other suitable terminator at the channel interface 180. Echo suppression circuit 184 separates the uplink data stream from the downlink data stream which is carried over the same pair of conductors. The Manchester encoded data stream passes from echo suppression circuit 184 to line equalizer 186, which compensates for any distortions in the uplink data stream during transmission from a transceiver 50. The output of line equalizer 186, still in the form of a two-level, Manchester encoded data stream, passes to differential receiver 188 which converts the Manchester encoded data stream to a single-ended bipolar signal. LED 81 discussed above is attached to one of the lines between line equalizer 186 and differential receiver 188.

A downlink video data stream from a processor module 8 and designated for a transceiver 50 connected to a particular channel interface 180 is supplied to differential driver 190 and then to a signal conditioner 192 which passes the downlink video data stream to the other pair of wires in the cable attached to RJ45 connector 182. The signal conditioner 192 is used to selectively distort the pulse shape of the downlink video data stream before it is transmitted over the cable and helps to ensure that a pulse stream of good shape and form is received at the transceiver 50. LED 83 discussed above is attached to one of the lines between differential driver 190 and the signal conditioner 192.

A downlink data stream from a processor module 8 and designated for a particular transceiver 50 connected to a particular channel interface 180 is supplied to differential driver 194 which has its pair of output lines connected to the uplink data/downlink data pair of conductors in the cable attached to RJ45 connector 182. LED 82 discussed above is attached to one of the output lines of differential driver 194.

Figure 11A:
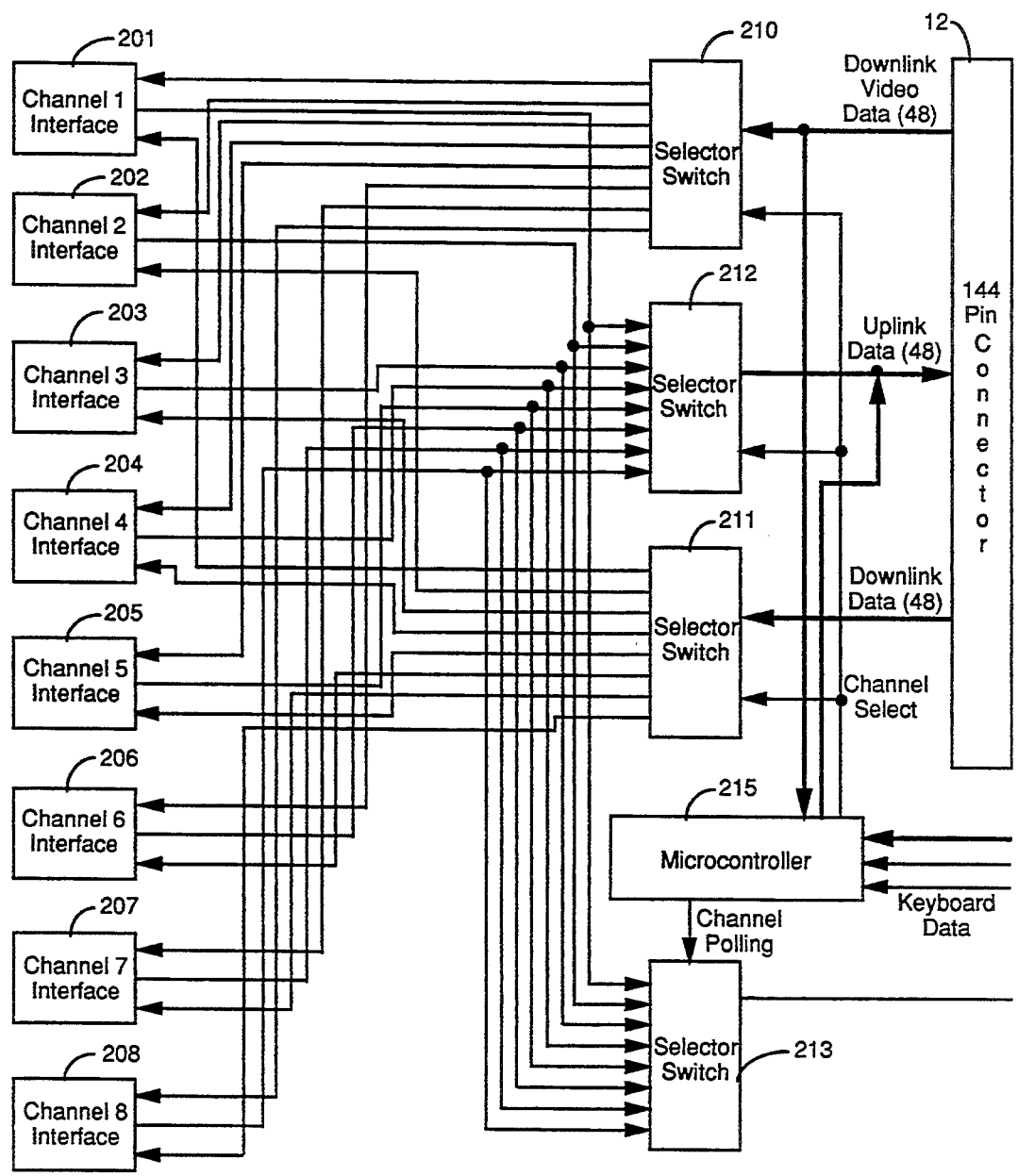
FIGS. 11A and 11B are block diagrams of the I/O module shown in FG 1.
Figure 11B:
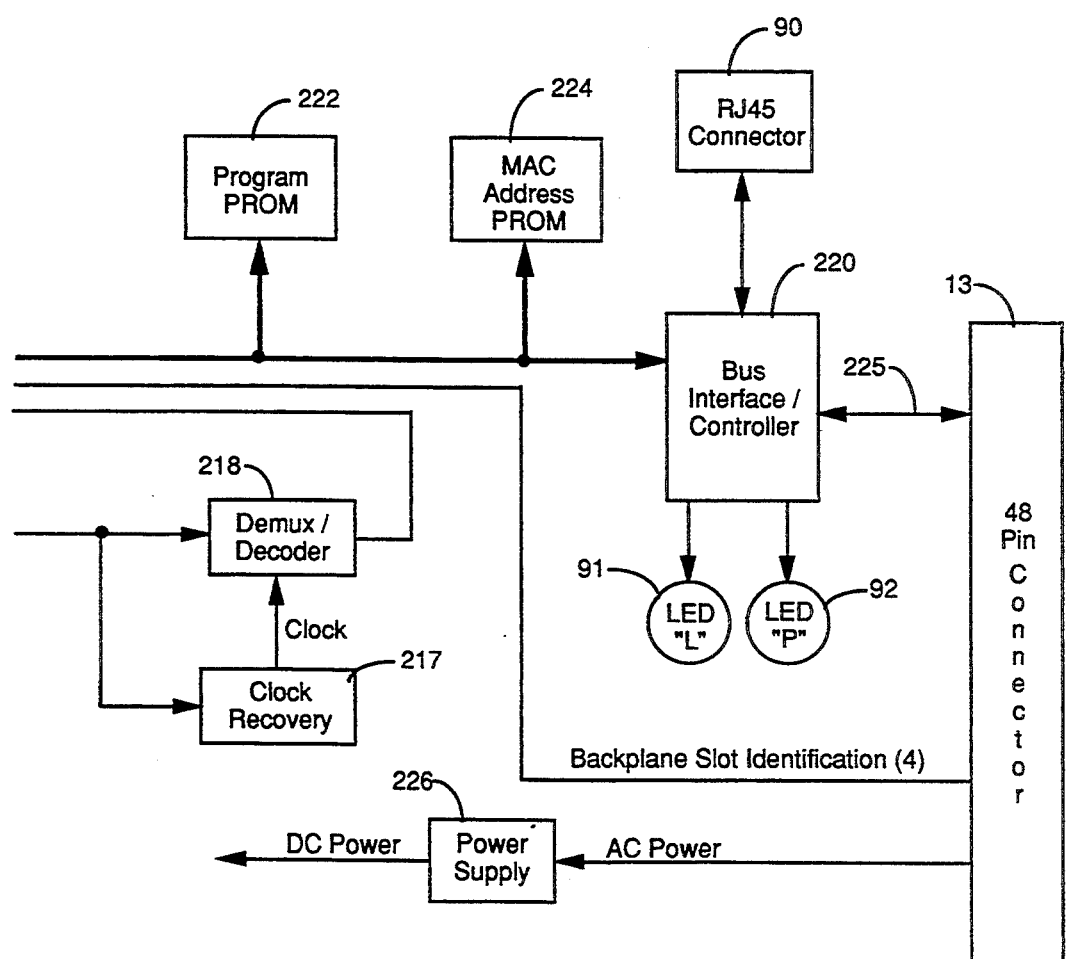

A block diagram of the I/O module 6 shown in FIGS. 1 and 4 is shown in FIGS. 11A and 11B. Eight of the channel interfaces 180 shown in FIG. 10 are included in the I/O module 6 shown in FIGS. 11A and 11B and are identified by reference numbers 201, 202, 203, 204, 205, 206, 207 and 208. These channel interfaces correspond to the channel RJ45 connectors (e.g., RJ45 connectors 80 and 85) shown on the front panel 10 of the I/O module 6. It is, however, to be understood that a greater or lesser number of channel interfaces 180 could be included in the I/O module 6 as desired. Forty-eight of the data lines in the backplane 4, carrying the downlink video data, extend from 144 pin male connector 12 to the forty-eight input lines of selector switch 210. Similarly, another forty-eight of the data lines in the backplane 4, carrying the downlink data, extend from 144 pin male connector 12 to the forty-eight inputs of selector switch 211. The eight output lines of selector switch 210 are separately supplied to a downlink video data input line on separate of the eight channel interfaces 201–208. Similarly, the eight output lines of selector switch 211 are separately supplied to a downlink data input line on separate of the eight channel interfaces 201–208. The eight uplink data output lines from the channel interfaces 201–208 are supplied to the eight inputs of selector switch 212. The forty-eight output lines of selector switch 212 are supplied to the remaining forty-eight data lines of the backplane 4 through 144 pin male connector 12 and carry the uplink data streams. In addition, the eight uplink data lines from the eight channel interfaces 201–208 are supplied to selector switch 213.

As will be described hereinafter in more detail, selector switches 210, 211 and 212 function as a matrix switch which controllably provides an appropriate connection of the downlink video data, uplink data and downlink data streams between certain of the data lines in the backplane 4 through 144 pin male connector 12 in the I/O module 6 to an appropriate input or output line on the channel interfaces 201–208. This control is effectuated by a microcontroller 215 which supplies channel select signals to selector switches 210, 211 and 212 for activating the appropriate paths between the input and output lines in these selector switches. The microcontroller 215 also sends a channel polling signal to selector switch 213 which cycles through each of the eight I/O module channels to pass an uplink data stream from an active transceiver to clock recovery circuit 217 and demultiplexer/decoder 218. The presence of keyboard data in the uplink data stream indicates that a transceiver is active or in use, or that a user wishes to activate a connection between a transceiver and a processor module 8. Clock recovery circuit 217 also supplies a recovered clock signal from the uplink data stream to demultiplexer/decoder 218. Demultiplexer/decoder 218 looks for the presence of keyboard data in a selected I/O module channel and supplies this keyboard data to the microcontroller 215. From this keyboard data, the microcontroller 215 creates a table of user activity as monitored from keyboard activity. The microcontroller 215, through a connection from the downlink video data lines between selector switch 210 and 144 pin male connector 12, monitors the downlink video data streams to determine which processor modules 8 have been connected to the backplane 4 of the chassis 2 and are active.

The microcontroller 215 in the I/O module 6 is connected to and can share information with microcontrollers in other I/O modules through an I/O module network including a CSMA/CD bus which extends from the microcontroller 215 to bus interface/controller 220. The controlling program for the microcontroller 215 is stored in a Program PROM 222 connected to the CSMA/CD bus. In addition, the MAC address information is stored in a MAC Address PROM 224 also connected to the CSMA/CD bus. A single I/O module network line 225 extends from bus interface/controller 220 to one pin on 48 pin male connector 13. This connection is identical on all of the other I/O modules 6 and carries the shared information between the various I/O modules 6 through the backplane 4 to which the 48 pin male connectors 13 are joined. RJ45 connector 90, LED 91 and LED 92, all on the front panel 10 of the I/O module 6 and discussed above, are connected to bus interface/controller 220.

Four of the pins on 48 pin male connector 13 on the I/O module 6 receive information from the backplane 4 regarding a slot identification for the particular slot occupied by that I/O module. This backplane slot identification information is supplied to the microcontroller 215. In addition, AC power is supplied from the backplane 4 through 48 pin male connector 13 to power supply 226 in the I/O module 6. Power supply 226 converts the supplied AC power to a DC power used by the various electronic components in the I/O module 6.

By scanning the downlink video data streams between selector switch 212 and 144 pin male connector 12, the microcontroller 215 can identify which ports or interfaces of each processor module 8 are in active use through a transceiver and, at the same time, the microcontroller 215 can identify which ports on which processor modules 8 are available for user interconnection. The microcontroller 215 constantly polls the keyboard data to find desired user activity. If a user has initiated activity through the keyboard, the microcontroller 215 will seek an available processor port. When an available processor port is found, the microcontroller 215 will send appropriate signals to selector switches 210, 211 and 212 to connect the desired channel to a particular one of the forty-eight data lines connected thereto. Since each of the forty-eight data lines is connected to a unique processor port, in groups of three for the three different data streams, a dedicated connection between the user through a channel interface and to a particular processor port will be established and will remain open until altered by the microcontroller 215. Once the microcontroller 215 has made an appropriate connection between a user and a processor port, it will transmit that information to other I/O modules along network line 225. Conversely, the microcontroller 215 in a particular I/O module 6 will have learned previously which other I/O modules 6 have made active connections between a channel interface and a port on a processor module 8 and use this shared information in its own channel connection calculations.

Figure 12:
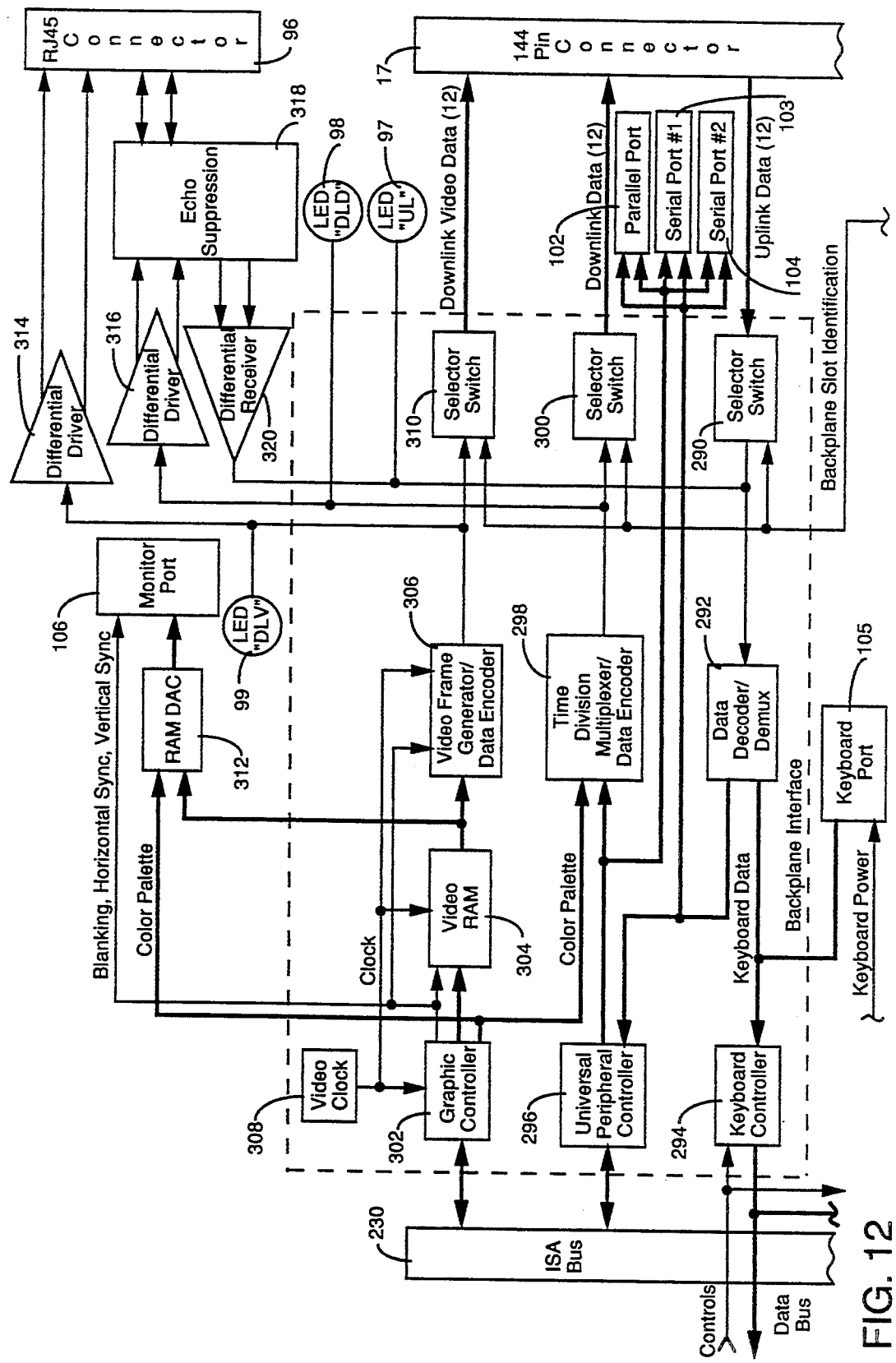
FIG. 12 is a block diagram of a backplane interface used in the processor module shown in FIG. 1.
Figure 13A:
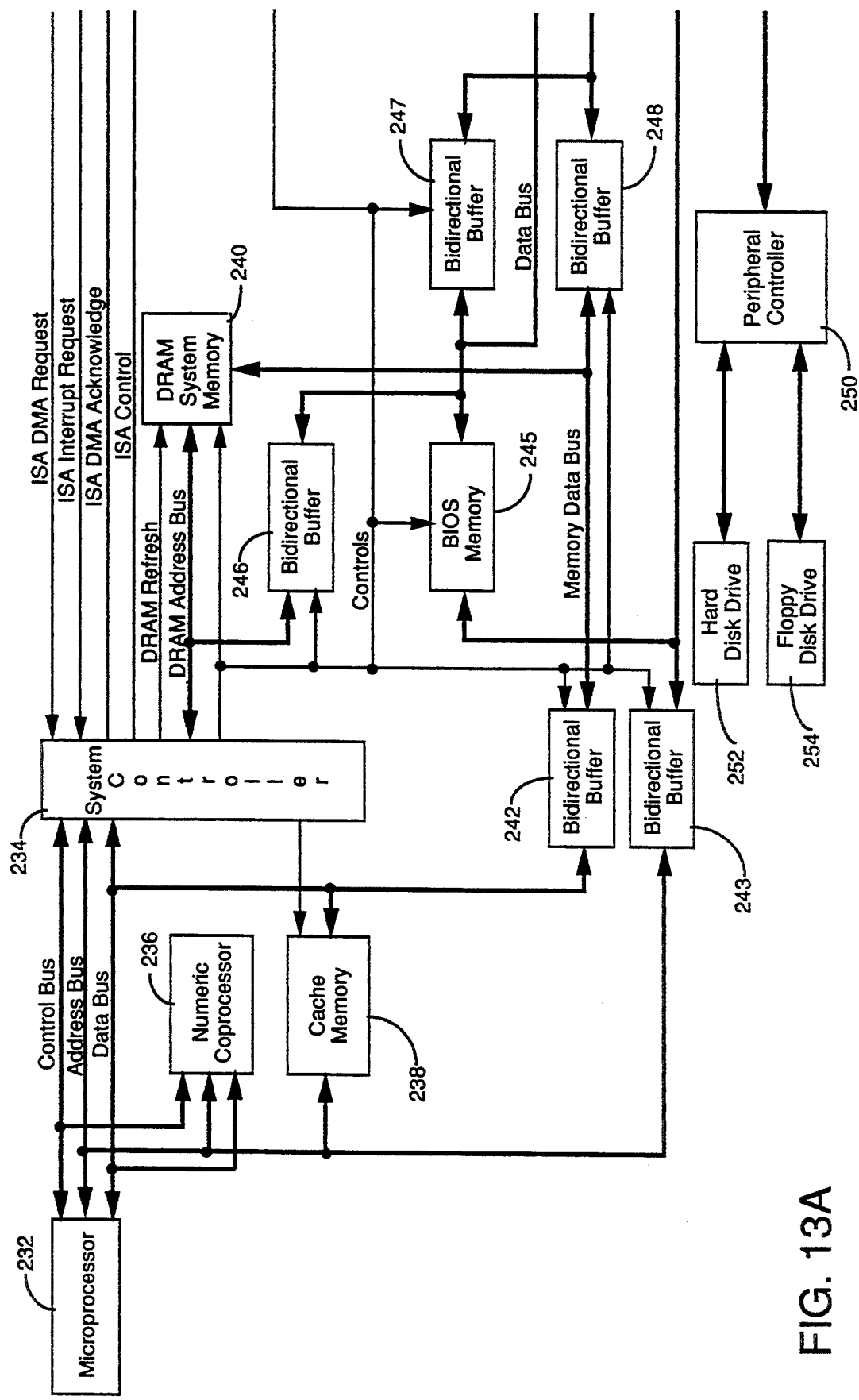
FIGS. 13A and 13B are block diagrams of the processor module shown in FIG. 1.
Figure 13B:
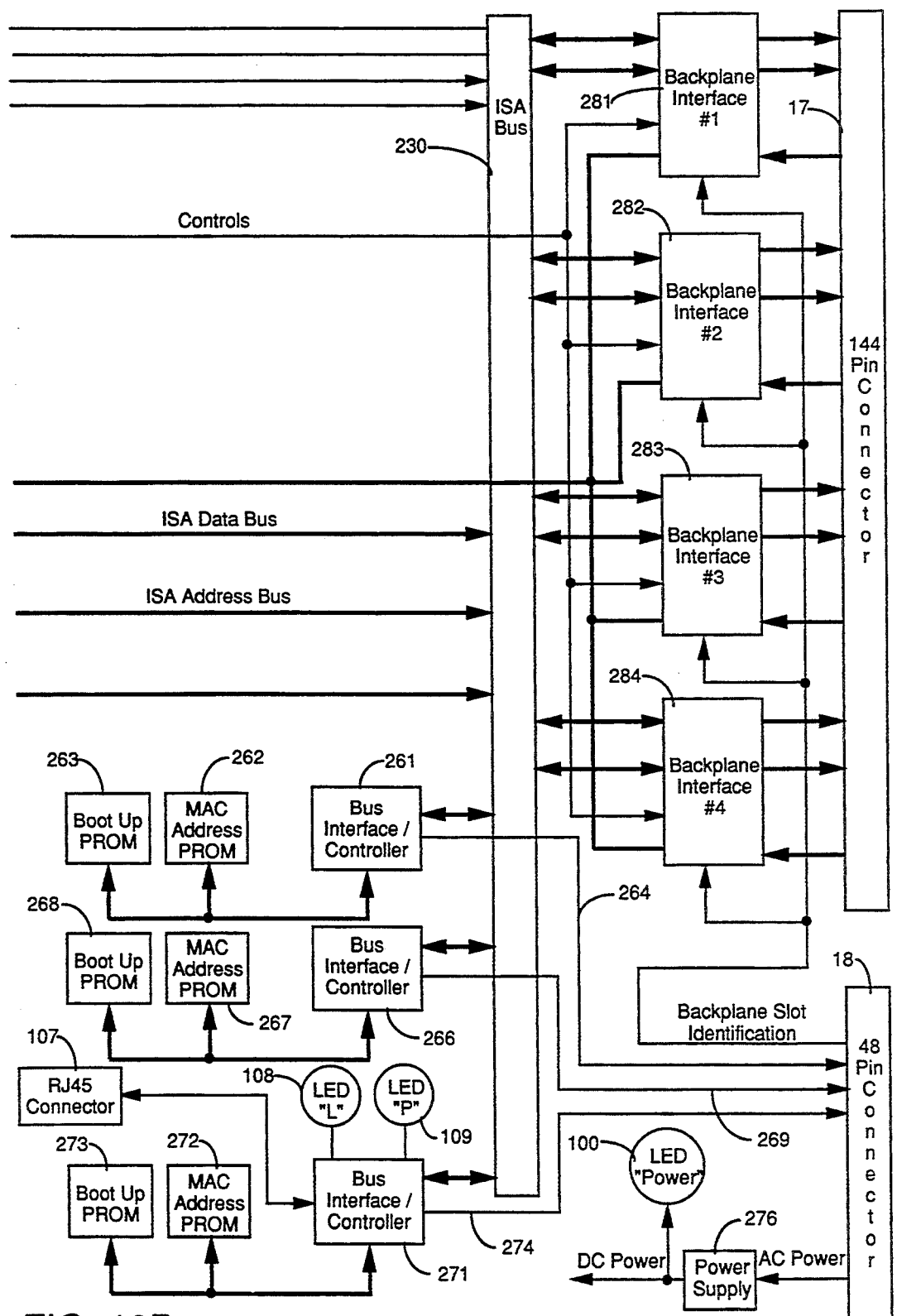

The processor module 8 of FIGS. 1 and 5 is shown in block diagram form in FIGS. 12, 13A and 13B. The connection of the processor module 8 to the backplane 4 in the chassis 2 is provided through 144 pin male connector 17 and 48 pin male connector 18. The main processing portion of the processor module 8 includes a processor bus, such as an industry standard ISA bus 230, and a microprocessor 232, such as an Intel 80386 or 80486. The processor bus 230 could follow other industry standards, such as EISA or the like. Communication between the microprocessor 232 and the ISA bus 230 is controlled by a system controller 234. Extending between the microprocessor 232 and the system controller 234 are a control bus, address bus and data bus. These three bus lines can also extend to an optional numeric coprocessor 236 which, if used, helps to speed up the activities of the microprocessor 232. The address bus and data bus may also be supplied to an optional cache memory 238 which is used, under control of the system controller 234, to increase overall performance of the microprocessor 232. The system controller 234 transmits ISA DMA Acknowledge and ISA Control signals to the ISA bus 230. Likewise, the ISA bus transmits ISA DMA Request and ISA Interrupt Request signals to the system controller 234.

The processor module 8 also includes an expandable, DRAM system memory 240, which has a DRAM Address bus and DRAM Refresh line connected to the system controller 234. The DRAM memory data bus is isolated from the microprocessor data bus by bidirectional buffer 242. Bidirectional buffer 243 isolates the microprocessor address bus from the ISA address bus and the address bus for a BIOS memory 245. The BIOS memory 245 stores a program, referred to as the Basic Input/Output System, which assists in running the microprocessor 232. Bidirectional buffer 246 isolates the BIOS memory data bus from the DRAM Address bus, bidirectional buffer 247 isolates the BIOS data bus from the ISA data bus, and bidirectional buffer 248 isolates the DRAM data bus from the ISA data bus. Control signals are sent from the system controller 234 to the DRAM system memory 240 and bidirectional buffers 242, 243, 246, 247 and 248, and to the cache memory 238. A peripheral controller 250 interfaces optional hard disk drive 252 and floppy disk drive 254 to the ISA bus 230.

The above describes the elements of a known microprocessor-based computer processing unit. Other computer processing arrangements could be readily used in the processor modules 8 of the present invention.

Communication with other processor modules 8 is maintained over one or more bus interface/controllers connected to processor network lines in the backplane 4. Each bus interface/controller communicates with the ISA bus and also with a contact on 48 pin male connector which communicates with a separate processor network line in the backplane 4. Each bus interface/controller has a boot up PROM and MAC Address PROM associated therewith. The bus interface/controller uses the boot up PROM program for initialization and the MAC Address PROM for bus address identification.

Bus interface/controller 261 is connected to the ISA bus 230 and has MAC Address PROM 262 and boot up PROM 263 connected thereto. Network line 264 extends from bus interface/controller 261 to a contact on 48 pin male connector 18. Similarly, bus interface/controller 266 is connected to the ISA bus 230 and has MAC Address PROM 267 and boot up PROM 268 connected thereto. Network line 269 extends from bus interface/controller 266 to another contact on 48 pin male connector 18. Likewise, bus interface/controller 271 is connected to the ISA bus 230 and has MAC Address PROM 272 and boot up PROM 273 connected thereto. Network line 274 extends from bus interface/controller 271 to yet another contact on 48 pin male connector 18. RJ45 connector 107, LED 108 and LED 109, on the front panel 15 of the processor module 8, and discussed above, are connected to one of the processor module bus interface/controllers, here bus interface/controller 271.

While the arrangement shown in FIG. 13B includes three such bus interface/controllers, it is to be understood that a lesser or greater number of bus interface/controllers may be connected to the ISA bus and have a corresponding number of separate network lines connected to separate connections on 48 pin male connector 18. In addition, any of the available serial or parallel high speed networking protocols can be used for the processor network lines, including Ethernet, Token Ring, IEEE 802.3, FDDI, VME, Multibus or Futurebus. Moreover, different network protocols can be used on a single processor module 8, provided that the same protocol is used in each processor module 8 along a particular shared processor network line.

As will be described hereinafter in more detail, AC power is supplied from 48 pin male connector 18 to power supply 276 within the processor module 8. Power supply 276 converts the supplied AC power to DC power necessary for operating the various electronic components in the processor module 8. LED 100 on the front panel 15 of the processor module 8, and discussed above, is connected to the DC power output from power supply 276.

Communication of the uplink data, downlink data and downlink video data streams to and from a processor module 8 is carried out through one or more backplane interfaces in the processor module 8 and positioned between 144 pin male connector 17 and the ISA bus 230. In the particular arrangement shown in FIG. 13B, four such backplane interfaces 281, 282, 283 and 284 are shown. However, it is to be understood that other quantities of backplane interfaces can be used, depending on the processing capabilities of the computer processing portion of the processor module 8 and the number of possible users that it is desired to have sharing the processing capabilities of a particular processor module 8. With the use of four backplane interfaces 281–284 as shown in the present embodiment, it is possible to have four separate users sharing a particular processor module 8. In other words, one particular processor module 8 can support up to four separate users, each transmitting data to and from the computer network system of the present invention through their own transceiver 50.

The details of the elements in one of the backplane interfaces is shown in FIG. 12, with the backplane interface surrounded by a dashed line. It is to be understood that each of the four backplane interfaces 281, 282, 283 and 284 in FIG. 13B are identical to the backplane interface enclosed in the dashed line in FIG. 12.

Twelve lines of 144 pin male connector 17, which could carry uplink data from the data lines in the backplane 4, are connected to selector switch 290 in the backplane interface. A backplane slot identification signal, which indicates the chassis 2 slot to which the processor module 8 is mounted, is supplied to selector switch 290 from 48 pin male connector 18. Depending on the particular location of the processor module 8 within the chassis 2, one of the twelve uplink data lines from 144 pin male connector 17 to selector switch 290 will be activated, in a dedicated fashion, for transmission of an uplink data stream to the processor module 8 through that particular backplane interface. The data stream from selector switch 290 is then supplied to data decoder/demultiplexer 292 which decodes and demultiplexes the uplink data stream into the separate data streams generated by the various peripheral devices, including a keyboard, connected to a transceiver 50. Using the embodiment of the transceiver 50 shown in FIG. 3, the uplink data stream would be separated into a parallel port data stream, serial port #1 and #2 data streams, and a keyboard data stream. The keyboard data stream, which is always included, is supplied to an intelligent keyboard controller 294 in the backplane interface. The keyboard controller 294 interfaces the keyboard data to the BIOS data bus and the keyboard controller 294 is subject to control signals from the system controller 234.

The parallel port and serial port data streams of the uplink data stream are sent to a universal peripheral controller 296 in the backplane interface. The universal peripheral controller 296 interfaces these signals to the ISA bus 230. Downstream parallel and serial port data for a particular user who initiated a processing session, which is being carried out through a particular backplane interface, is received from the ISA bus 230 by the universal peripheral controller 296. The universal peripheral controller 296 passes this data to a time division multiplexer and data encoder 298 which generates the encoded, serial data stream discussed above in connection with FIG. 7 and supplies the data stream to selector switch 300. Similar to selector switch 290 discussed above, selector switch 300 is connected to twelve lines extending between selector switch 300 and 144 pin male connector 17 and, hence, to twelve of the data lines in the backplane 4. Depending on the backplane slot identification signal, selector switch 300 will, in a dedicated manner, select one of the twelve lines to transmit a downlink data stream between that particular backplane interface and 144 pin male connector 17 and to one of the data lines in the backplane 4.

A downlink video data stream is received from the ISA bus 230 in a graphic controller 302 in the backplane interface. The color palette information from the downlink video data stream is supplied from the graphic controller 302 to time division multiplexer/data encoder 298 where this information is combined into the downlink data stream. The pixel data of the video stream is supplied from the graphic controller 302 to video RAM 304 which supplies its output to video frame generator/data encoder 306. The blanking, horizontal sync and vertical sync signals are supplied from the graphic controller 302 to both video RAM 304 and video frame generator/data encoder 306. Video clock 308 supplies a clock signal to the graphic controller 302, video RAM 304, and video frame generator/data encoder 306. These elements generate the encoded, serial downlink data stream, including the data frames and Manchester encoding, shown in FIG. 9 and discussed above.

The encoded, serial downlink video data stream is supplied from video frame generator/data encoder 306 to selector switch 310. Selector switch 310 is connected to twelve lines extending to 144 pin male connector 17 and, hence, to twelve of the data lines in the backplane 4. As dictated by the backplane slot identification, one of the twelve downlink video data lines of selector switch 310 will, in a dedicated manner, carry a downlink video data stream between a particular backplane interface in a particular processor module 8, depending on the location of the processor module 8 in the chassis 2.

The above-described elements are included in each of the four backplane interfaces 281–284 in the processor module 8. In order to give the processor module 8 more flexibility, and enable it to be used in the standalone configuration, additional connections can be made to one of the backplane interfaces in the processor module 8 from the front panel 15 thereof. This was discussed above briefly in connection with FIG. 5. Referring to FIG. 5 as well as to FIG. 12, keyboard port 105 can be connected to the data line extending between the data decoder/demultiplexer 292 and the keyboard controller 294. In addition, keyboard power can be supplied to keyboard port 105 from the DC power supplied to the processor module 8. Monitor port 106 receives blanking, horizontal sync and vertical sync signals from the graphic controller 302, and red, blue and green color analog signals from R DAC 312. The RAM DAC 312 receives color palette information directly from the graphic controller 302 and pixel data from video RAM 304. Parallel port 102, serial port #1 103 and serial port #2 104 tap into the data path extending between data decoder/demultiplexer 292 and the universal peripheral controller 296 as well as the data path extending between the universal peripheral controller 296 and time division multiplexer/data encoder 298. The uplink data, downlink data and downlink video data streams can be accessed through RJ45 connector 96. The downlink video data stream is sampled at the line extending between video frame generator/data encoder 306 and selector switch 310 and is supplied to LED 99 and to differential driver 314, which has its pair of output lines connected to one pair of lines in RJ45 connector 96. The downlink data stream is sampled at the line extending between time division multiplexer/data encoder 306 and selector switch 300 and is supplied to LED 98 and differential driver 316, which has its pair of output lines connected to echo suppression circuit 318 which, in turn, is connected to the other pair of lines in RJ45 connector 96. Uplink data is supplied through RJ45 connector 96, through echo suppression circuit 318 and to differential receiver 320. The output of differential receiver 320 is connected to LED 97 and to the line extending between selector switch 290 and data decoder/demultiplexer 292.

Figure 14:
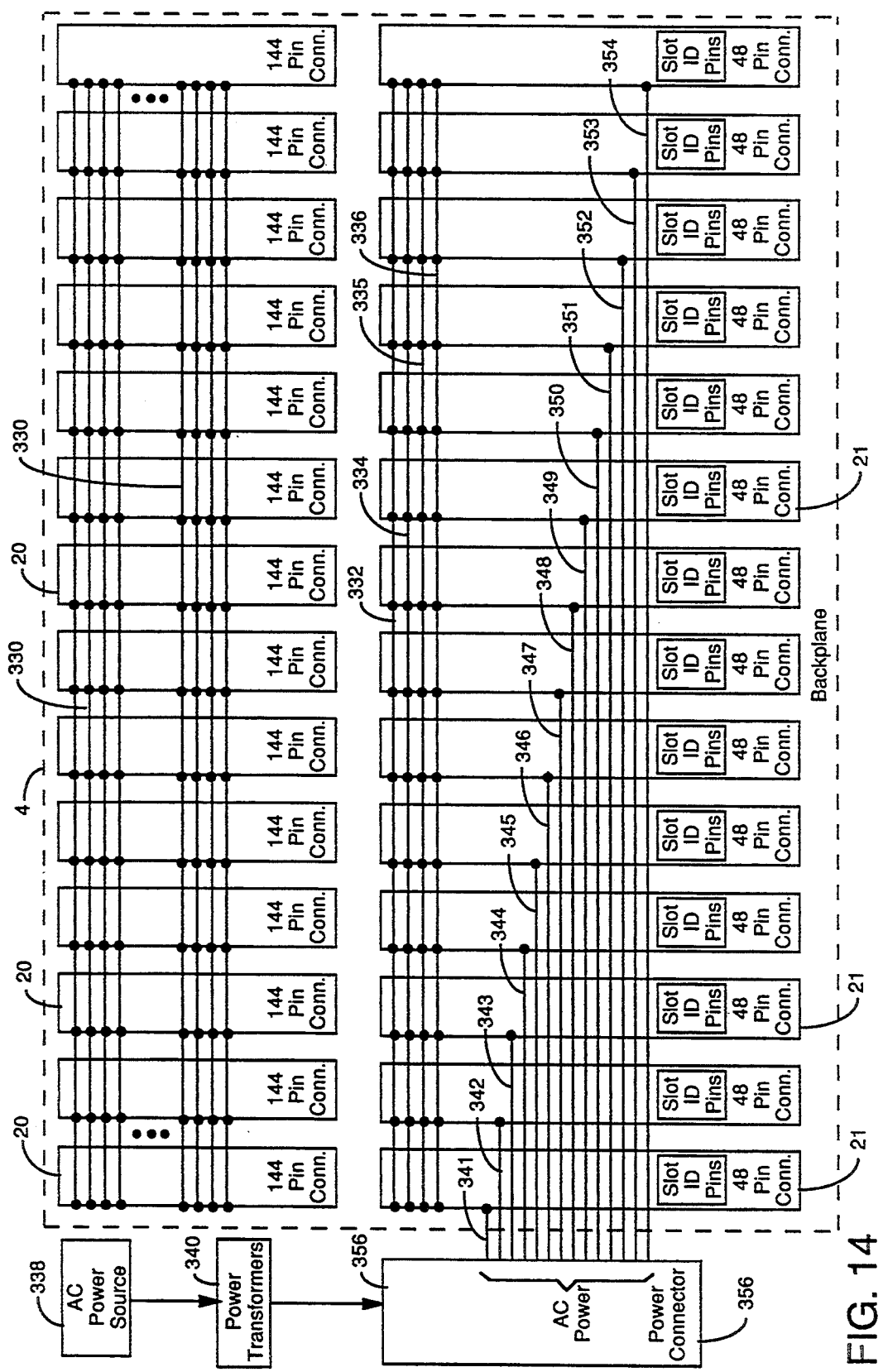
FIG. 14 is a block diagram of the backplane shown in FIG. 1.

FIG. 14 shows a block diagram of the backplane 4 used in the chassis 2 shown in FIG. 1. The arrangement of this backplane 4 can accommodate up to fourteen modules, including up to twelve processor modules 8 and at least one I/O module 6. Since each module includes a 144 pin male connector and a 48 pin male connector, each slot of the backplane 4 includes a 144 pin female connector 20 and an associated 48 pin female connector 21 as discussed above. Each conductive pin or contact in each 144 pin female connector 20 is connected in serial manner to the same associated conductive pin or contact on each of the other 144 pin female connectors 20. These 144 connections, shown as reference number 330 in FIG. 14, form a plurality of interconnected backplane data lines and provide the data flow of the uplink data, downlink data, and downlink video data streams between the various modules as described above.

Four of the pins on each 48 pin female connector 1 are dedicated to providing the backplane slot identification signals supplied to the processor module 8 and I/O module 6. These pins are either grounded, to represent a binary "0" or are connected to +5 volts, to represent a binary "1". Using a binary coded scheme, such as the arrangement set forth below, each of the fourteen slots in the backplane 4 can be uniquely identified with four of the pins in the 48 pin female connectors 21.

| Slot | Binary Code Identification |
|------|---------------------------|
| 1    | 0001                      |
| 2    | 0010                      |
| 3    | 0011                      |
| 4    | 0100                      |
| 5    | 0101                      |
| 6    | 0110                      |
| 7    | 0111                      |
| 8    | 1000                      |
| 9    | 1001                      |
| 0    | 1010                      |
| 11   | 1011                      |
| 12   | 1100                      |
| 13   | 1101                      |
| 14   | 1110                      |

In addition, the 48 pin female connectors 21 carry network lines extending between all of the slots in the backplane 4. These network lines include an I/O module network line 332 dedicated to providing interconnection between the I/O modules 6, and three processor network lines 334, 335 and 336 dedicated to providing interconnections between the processor modules 8. The I/O module network line 332 is connected through network line 225 to bus interface/controller 220 in the I/O module 6. The processor module network lines 334, 335 and 336 are connected through network lines 264, 269 and 274 to bus interface/controllers 261, 266 and 271, respectively, in the processor module 8.

Power can be supplied through the backplane 4 to each I/O module 6 and each processor module 8 through an appropriate pin or contact on each 48 pin female connector 21. Power is supplied from AC power source 338 to an external bank of AC power transformers 340 which supply low voltage AC power signals over separate lines 341-354 to each of the 48 pin female connectors 21 through a power connector 356 on the rear of the chassis 2, separate from the backplane 4.

Figure 15:
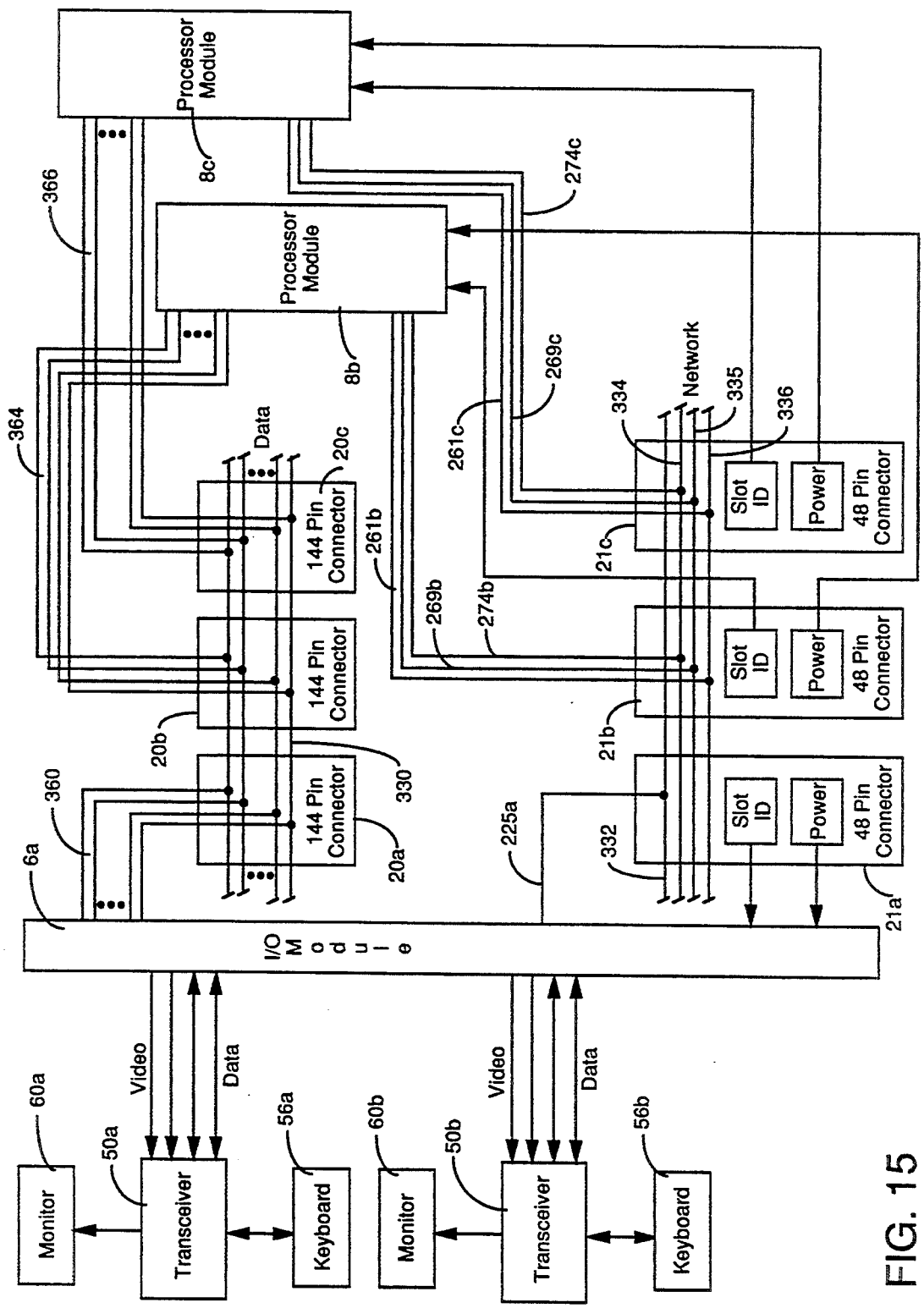
FIG. 15 is a block diagram of one example of a computer networking system and attached peripheral devices utilizing the present invention.

FIG. 15 is a block diagram of a simple computer networking system using the present invention. It represents the simplest configuration possible which utilizes the primary advantages and characteristics of the present invention. A single I/O module 6a has its data lines 360 connected through 144 pin female connector 20a to the data lines 330 in the backplane 4, has its network line 225a connected through 48 pin female connector 21a to the I/O network line 332 in the backplane 4, and receives slot identification information and its power from 48 pin female connector 21a. A first processor module 8b has its data lines 364 connected through 144 pin male connector 20b to the data lines 330 in the backplane 4, has its three network lines 261b, 269b and 274b connected through 48 pin female connector 21b to the three processor network lines 334, 335 and 336 in the backplane 4, and receives slot identification information and power from 48 pin female connector 21b. A second processor module 8c has its data lines 366 connected through 144 pin male connector 20c to the data lines 330 in the backplane 4, has its three network lines 261c, 269c and 274c connected through 48 pin female connector 21c to the three processor network lines 334, 335 and 336 in the backplane 4, and receives slot identification information and power from 48 pin female connector 21c. A first transceiver 50a is connected to one of the channel interfaces on the I/O module 6a and a second transceiver 50b is connected to another of the channel interfaces on the I/O module 6a. The first transceiver 50a is connected to a monitor 60a and keyboard 56a and, similarly, the second transceiver 50b is connected to a monitor 60b and keyboard 56b. A monitor and keyboard is the minimum peripheral equipment that must be attached to a transceiver to enable a user to tap the processing capabilities of the present invention.

In operation, a user would indicate that he/she wished to use the present invention by an appropriate command sent over a keyboard connected to a transceiver. The I/O module monitors the keyboard activity and detects the initiation of user activity through one of the transceivers. The I/O module determines which ports or backplane interfaces of each processor module are available for processing capabilities and will make appropriate connections of the data streams to connect a particular transceiver to a particular backplane interface of a particular processor module. While the data to and from a particular transceiver is carried to all of the I/O modules and processor modules through the data lines in the backplane, the I/O modules and the processor modules will be configured accordingly so that only the appropriate I/O module connections and processor module connections receive and transmit the data to a particular transceiver. If a processor module needs to share its processing capabilities with another processor module, this will be carried out over one or more of the processor network lines 334-336 in the backplane 4.

Figure 16:
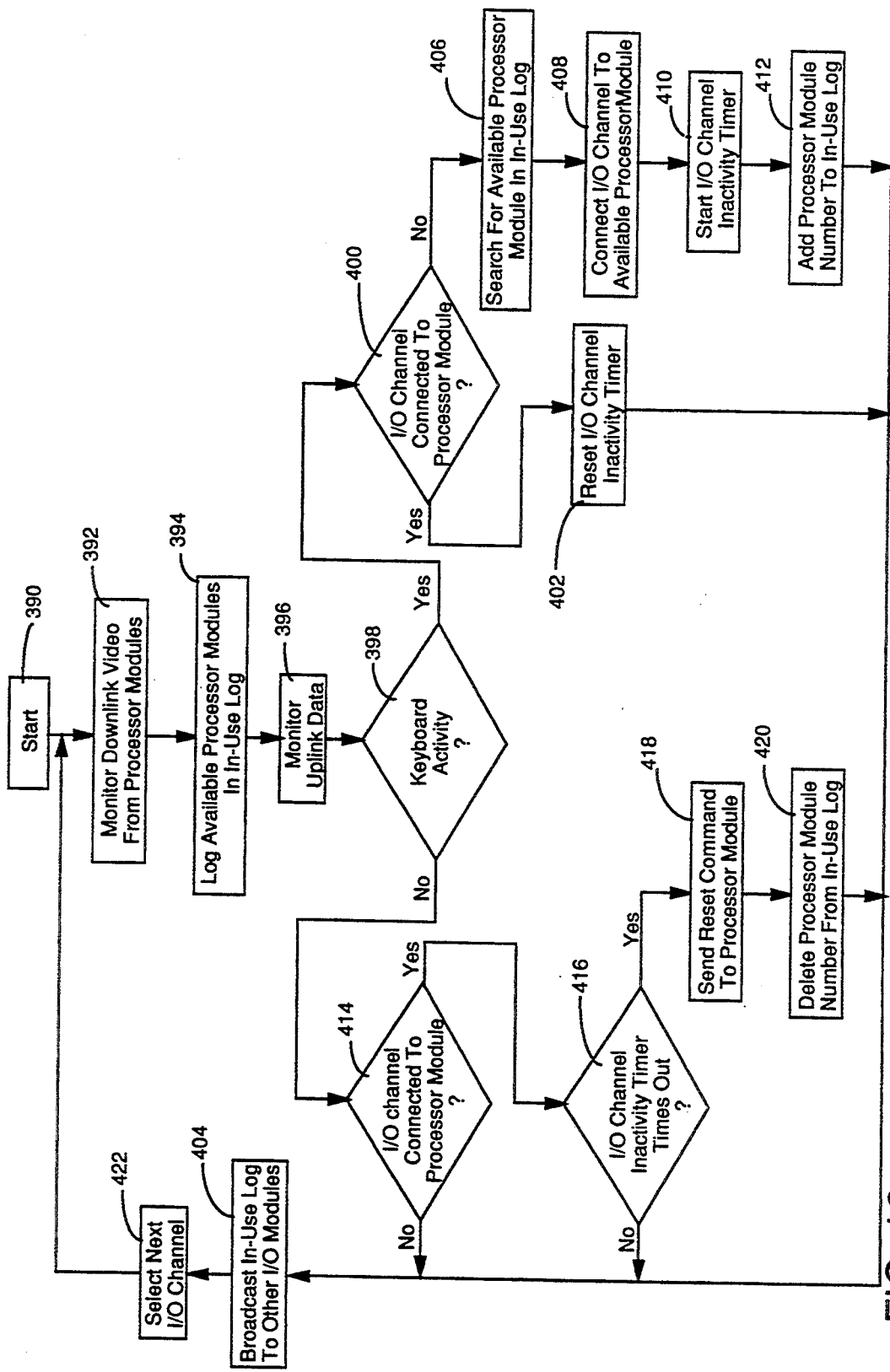
FIG. 16 is a flow chart of the operation of the program PROM software used in the I/O module shown in FIGS. 11A and 11B.

FIG. 16 is a flow diagram showing the operation of the software in the Program PROM 222 through the microcontroller 215 in the I/O module and how the I/O modules make connections and allocate resources between the processor modules 8. After the program initiates itself at the start block 390, control is passed to block 392 where the I/O module monitors the downlink video signal from the processor modules. Even if a particular processor module is not engaged in computing, it will send an inactive video signal or idle pattern across the data lines to which it is connected. The I/O module monitors the appropriate data lines for the presence of this idle pattern and this signal tells the I/O module that processor modules have been plugged into the backplane 4 at particular locations and may be available for satisfying the processing demands of a user. The microcontroller 215 in the I/O module monitors the video data streams through the connection from the downlink video data lines as shown in FIG. 11A. Control is then passed to block 394 where the microcontroller 215 creates a log of available processor modules in a "In-Use Log". Control then passes to block 396 where the I/O module monitors the uplink data lines to look for keyboard activity from a user. In query block 398, the program asks whether keyboard activity is present at a particular I/O channel interface. If the query is answered "yes", this indicates that a user wants access to the system and control passes to query block 400 where the I/O module determines whether the channel interface with the keyboard activity is already connected to a processor module. If the query is answered "yes" then control is passed to block 402, where an I/O channel inactivity timer is reset. Control is then passed to block 404 where the I/O module broadcasts its In-Use Log data to other I/O modules. This data on the "In-Use Log" of a particular I/O module is broadcast to each of the other I/O modules, if others are included in the system, over the I/O module network line. It is important that each I/O module not only keep track of its own In-Use Log, but also modify its In-Use Log on the channel connections which have been established between the other I/O modules and the available processor module backplane interfaces.

Returning to query block 400, if the system determines that the I/O channel has not been connected to a processor module, then control passes to block 406 where the I/O module searches in its In-Use Log for an available backplane interface in a processor module. Once an available processor module backplane interface has been found, then control passes to block 408 and the I/O module connects that particular I/0 channel to a particular available processor module backplane interface. Control then passes to block 410 where an inactivity timer for that particular I/O channel is started. This inactivity timer is monitored so that if a channel connection to a processor module had been made, and the system detects no activity over that channel for a predetermined period of time, this indicates to the system that the user is no longer interested in using that channel. After the inactivity timer has been started, control passes to block 412 where the I/0 module adds that just made processor module connection (in block 408) to its In-Use Log. Control then passes to block 404 which is discussed above.

Returning to query block 398, if the I/O module determines that there is no keyboard activity in a particular I/O channel, control passes to query block 414 where the system determines whether the I/O channel is already connected to a processor module. If the query is answered "no", then control is passed to block 404. If the query is answered "yes", then control is passed to query block 416 where the system determines whether the I/O channel inactivity timer for that particular channel has exceeded the predetermined period of time. If the query is answered "no" control then passes to block 404 If the query is answered "yes", the link between that particular I/O channel and the particular processor interface is to be broken. Control then passes to block 418 where the I/O module sends a reset command, from the microcontroller 215 and over the uplink data lines, to reset the processor module and disconnect its computing for that particular I/O channel. Control then passes to block 420 where the I/O module deletes that particular processor module connection and interface connection number from its In-Use Log. Control then passes to block 404 described above.

In all situations, control passes from block 404 to block 422 where the next I/O channel interface in a particular I/O module is selected and all of the steps discussed above, downstream of the start block 390, are repeated. In this manner, the I/O module continually monitors keyboard activity and processing activity through each of its I/O channel inferaces.

By the arrangement of the present invention, the computer processing units of the personal computer LAN have been removed from the widely separated user's locations and collected together in a central location. This permits the processing capabilities to be connected over a high speed bus which extends, at best, only across the length of the backplane. Long lengths of expensive network cabling, which also limit the speed of network operations, are eliminated. Also, computer processing units can be shared and reduce the need for a dedicated computer processing unit at each user's location. The number of processing modules used in the present system will be dictated by the demand from the entire system. A user need only a transceiver unit, a keyboard and a monitor to tap into the computer network system of this invention. The computer network system of this invention is, indeed, easy to configure and operate, is readily modifiable for different network requirements, and can be easily changed to accommodate the rapid changes in network protocols, computer processing capabilities and the like.

Having described the presently preferred embodiments of the present invention, it is to be understood that the invention may be otherwise embodied within the scope of the appended claims.

I claim:

1. A computer networking system comprising:
   a) a chassis positioned at a central location and adapted to receive a plurality of electronic modules, said chassis including a backplane formed of a plurality of electronic module receiving slots each including a plurality of conductive contacts and electrical connections between associated conductive contacts in each slot, with the electrical connections in the backplane including a plurality of data lines and at least one processor network line;
   b) at least two processor modules attached to said chassis and connected to the conductive contacts in separate of the backplane slots, with said processor modules each including at least one computer processor, at least one backplane interface between the computer processor and the backplane data lines, and a network interface/controller connected between the computer processor and the processor network line in the backplane, with the computer processor including means for receiving uplink data streams from certain of the backplane data lines through the backplane interface and means for generating downlink data streams and downlink video data streams which are supplied to other of the backplane data lines through the backplane interface;

c) at least one I/O module attached to said chassis and connected to the conductive contacts in another of the backplane slots, with said I/O module including a plurality of channel interfaces, means for determining if a processor module backplane interface is available, and means for selectively connecting a particular channel interface to the backplane data lines associated with an available processor module backplane interface and directing downlink data streams, downlink video data streams and uplink data streams between a processor module and a particular I/O module channel interface through data paths over the selected backplane data lines;

d) a plurality of transceivers positioned at various locations remote from said chassis, with each transceiver including a plurality of I/O ports adapted to be connected to various peripheral devices, and including at least a keyboard port and a video monitor port, with each transceiver including means for directing a downlink video data stream from an I/O connection in the transceiver to the monitor port, and means for directing downlink data and uplink data streams between the transceiver I/O connection and appropriate of the I/O ports in the transceiver; and e) communication links extending from the I/O connection of each transceiver to a unique channel interface in the I/O module for transmitting said uplink data, downlink data and downlink video data streams between the I/O module and the transceivers, with the downlink video data streams each including certain signals developed by a processor module for generating screen displays in a video monitor, with said downlink data streams each including certain signals developed by a processor module for the various I/O ports of a transceiver other than the signals in the downlink video data streams, with the uplink data streams each including the incoming signals developed by peripheral devices connected to a transceiver, with the I/O module including means for maintaining the selected data paths over the backplane from an active transceiver to an available processor module backplane interface and for closing the selected data paths when the transceiver becomes inactive, and with the sole computer processing capability of said system located in said chassis.

2. The computer networking system of claim 1 further including a plurality of processor network lines in said backplane, with each processor module including separate network interface/controllers connected between the computer processor and separate of the processor network lines in the backplane.

3. The computer networking system of claim 1 wherein each processor module includes a plurality of backplane interfaces between the computer processor and the backplane data lines.

4. The computer networking system of claim 3 wherein each processor module includes selection means for selectively connecting each of the uplink data, downlink data and downlink video data streams in each backplane interface to a separate one of a predetermined plurality of backplane data lines.

5. The computer networking system of claim 4 wherein the backplane includes means for generating a slot identification signal unique to each backplane slot, with the slot identification signal supplied to a processor module connected to a particular slot and used by said selection means.

6. The computer networking system of claim 1 including a plurality of I/O modules attached to said chassis and connected to the conductive contacts in separate of the backplane slots, with the electrical connections in the backplane including at least one I/O module network line, and with each I/O module including a network interface/controller connected between the I/O module and the I/O module network line, and with each I/O module having access to all backplane interfaces in all processor modules attached to said chassis.

7. The computer networking system of claim 6 wherein said I/O module includes an external network connection which permits external access at the chassis to the I/O module network line.

8. The computer networking system of claim 1 wherein the downlink video data stream is an encoded, multiplexed serial data stream carried over a video data communication link between a transceiver I/O connection and an I/O module channel interface, and wherein the uplink data and downlink data streams are each encoded, multiplexed serial data streams carried over a shared data communication link between a transceiver I/O connection and an I/O module channel interface.

9. The computer networking system of claim 8 wherein the transceiver includes means for multiplexing and encoding the uplink data streams, and means for demultiplexing and decoding the downlink data and downlink video data streams, and wherein the processor module includes means for multiplexing and encoding the downlink data and downlink video data streams, and means for demultiplexing and decoding the uplink data streams.

10. The computer networking system of claim 9 wherein the demultiplexing and decoding means and the multiplexing and encoding means for the processor module are located in each backplane interface.

11. The computer networking system of claim 8 wherein the data streams are serialized by a time division multiplexing arrangement and are encoded by a Manchester data encoding arrangement.

12. The computer networking system of claim 8 wherein the video data communication links and the data communication links are provided by a communication link selected from the group consisting of fiber optic cables, coaxial cables, shielded twisted pair cables, unshielded twisted pair cables, and wireless transmissions and associated interfaces.

13. The computer networking system of claim 1 further including power means associated with said backplane for supplying electrical power through each slot to a module connected thereto.

14. The computer networking system of claim 13 wherein said power means includes separate power lines extending in the backplane from a power source on the chassis to a particular conductive contact in each slot.

15. The computer networking system of claim 1 wherein said processor module includes an external network connection which permits external access at the chassis to one of the processor network lines.

16. The computer networking system of claim 15 wherein said processor module further includes an external data connection which permits external access at the chassis to an uplink data stream, downlink data stream, and downlink video data stream in one of the backplane interfaces.

17. The computer networking system of claim 16 wherein said processor module further includes a plurality of external I/O connections which permit peripheral devices to be connected at the chassis to a processor module through one of the backplane interfaces.

18. A computer networking system comprising:
a) a chassis positioned at a central location and adapted to receive a plurality of electronic modules, said chassis including a backplane formed of a plurality of electronic module receiving slots each including a plurality of conductive contacts and electrical connections between associated conductive contacts in each slot, with the electrical connections in the backplane including a plurality of data lines and at least one processor network line;
b) at least two processor modules attached to said chassis and connected to the conductive contacts in separate of the backplane slots, with said processor modules each including at least one computer processor, a plurality of backplane interfaces between the computer processor and the backplane data lines, and a network interface/controller connected between the computer processor and the processor network line in the backplane, with the computer processor including means for receiving uplink data streams from certain of the backplane data lines through the backplane interfaces and means for generating downlink data streams and downlink video data streams which are supplied to other of the backplane data lines through the backplane interface;
c) at least one I/O module attached to said chassis and connected to the conductive contacts in another of the backplane slots, with said I/O module including a plurality of channel interfaces, means for determining if processor module backplane interfaces are available, and means for selectively connecting a particular channel interface to the backplane data lines associated with an available processor module backplane interface and directing downlink data streams, downlink video data streams and uplink data streams between a processor module backplane interface and a particular I/O module channel interface through data paths over the selected backplane data lines;
d) a plurality of transceivers positioned at various locations remote from said chassis, with each transceiver including a plurality of I/O ports adapted to be connected to various peripheral devices, and including at least a keyboard port and a video monitor port, with each transceiver including means for directing a downlink video data stream from an I/O connection in the transceiver to the monitor port, and means for directing downlink data and uplink data streams between the transceiver I/O connection and appropriate of the I/O ports in the transceiver; and
e) communication links extending from the I/O connection of each transceiver to a unique channel interface in the I/O module for transmitting said uplink data, downlink data and downlink video data streams between the I/O module and the transceivers, with the downlink video data streams each including certain signals developed by a processor module for generating screen displays in a video monitor, with said downlink data streams each including certain signals developed by a processor module for the various I/O ports of a transceiver other than the signals in the downlink video data streams, with the uplink data streams each including the incoming signals developed by peripheral devices connected to a transceiver, with the I/O module including means for maintaining the selected data paths over the backplane from an active transceiver to an available processor module backplane interface and for closing the selected data paths when the transceiver becomes inactive, and with the sole computer processing capability of said system located in said chassis, wherein the downlink video data stream is an encoded, multiplexed serial data stream carried over a video data communication link between a transceiver I/O connection and an I/O module channel interface, and wherein the uplink data and downlink data streams are each encoded, multiplexed serial data streams carried over a shared data communication link between a transceiver I/O connection and an I/O module channel interface.

19. A computer networking system comprising:
a) a chassis positioned at a central location and adapted to receive a plurality of electronic modules, said chassis including a backplane formed of a plurality of electronic module receiving slots each including a plurality of conductive contacts and electrical connections between associated conductive contacts in each slot, with the electrical connections in the backplane including a plurality of data lines, at least one processor network line and at least one I/O module network line;
b) a plurality of processor modules attached to said chassis and connected to the conductive contacts in separate of the backplane slots, with said processor modules each including at least one computer processor, at least one backplane interface between the computer processor and the backplane data lines, and a network interface/controller connected between the computer processor and the processor network line in the backplane, with the computer processor including means for receiving uplink data streams from certain of the backplane data lines through the backplane interface and means for generating downlink data streams and downlink video data streams which are supplied to other of the backplane data lines through the backplane interface;
c) a plurality of I/O modules attached to said chassis and connected to the conductive contacts in separate of the backplane slots, with said I/O modules each including a plurality of channel interfaces, means for determining if a processor module backplane interface is available, a network interface/controller connected between the I/O module and the I/O module network line, and means for selectively connecting a particular channel interface to the backplane data lines associated with an available processor module backplane interface and directing downlink data streams, downlink video data streams and uplink data streams between a processor module and a particular I/O module channel interface through data paths over the selected backplane data lines, with each I/O module having access to all backplane interfaces in all processor modules attached to said chassis;

d) a plurality of transceivers positioned at various locations remote from said chassis, with each transceiver including a plurality of I/O ports adapted to be connected to various peripheral devices, and including at least a keyboard port and a video monitor port, with each transceiver including means for directing a downlink video data stream from an I/O connection in the transceiver to the monitor port, and means for directing downlink data and uplink data streams between the transceiver I/O connection and appropriate of the I/O ports in the transceiver; and e) communication links extending from the I/O connection of each transceiver to a unique channel interface in an I/O module for transmitting said uplink data, downlink data and downlink video data streams between the I/O modules and the transceivers, with the downlink video data streams each including certain signals developed by a processor module for generating screen displays in a video monitor, with said downlink data streams each including certain signals developed by a processor module for the various I/O ports of a transceiver other than the signals in the downlink video data streams, with the uplink data streams each including the incoming signals developed by peripheral devices connected to a transceiver, with the I/O modules each including means for maintaining the selected data paths over the backplane from an active transceiver to an available processor module backplane interface and for closing the selected data paths when the transceiver becomes inactive, and with the sole computer processing capability of said system located in said chassis, wherein the downlink video data stream is an encoded, multiplexed serial data stream carried over a video data communication link between a transceiver I/O connection and an I/O module channel interface, and wherein the uplink data and downlink data streams are each encoded, multiplexed serial data streams carried over a shared data communication link between a transceiver I/O connection and an I/O module channel interface.

20. The computer networking system of claim 19 wherein each procesor module includes a plurality of backplane interfaces between the computer processor and the backplane data lines.

* * * * *

UNITED STATES PATENT AND TRADEMARK OFFICE
CERTIFICATE OF CORRECTION

PATENT NO. : 5,428,806
DATED : June 27, 1995
INVENTOR(S): Alan L. Pocrass

It is certified that error appears in the above-indentified patent and that said Letters Patent is hereby corrected as shown below:

Abstract Line 4 "variou" should read --various--.

Column 4 Line 53 "the/transceiver" should read --the transceiver--.

Column 4 Line 65 "B;" should read --6B;--.

Column 5 Line 5 "he" should read --the--.

Column 5 Line 7 "FG" should read --FIG.--.

Column 7 Line 61 " ("#"P) " should read --("P")--.

Column 8 Line 63 "14,161" should read --14.161--.

Column 12 Lines 35-36 ". . . ," should read --. . .--.

Column 12 Line 50 ". . . ," should read --. . .--.

Column 18 Line 51 "R DAC" should read --RAM DAC--.

Column 19 Line 29 "connector 1" should read --connector 21--.

UNITED STATES PATENT AND TRADEMARK OFFICE
CERTIFICATE OF CORRECTION

PATENT NO. : 5,428,806
DATED : June 27, 1995
INVENTOR(S): Alan L. Pocrass

It is certified that error appears in the above-indentified patent and that said Letters Patent is hereby corrected as shown below:

Column 21 Line 17 "in a" should read --in an--.

Column 22 Line 2 after " "no" " insert --,--.

Column 22 Line 3 after "404" insert --.--.

Column 22 Line 20 "inferaces." should read --interfaces.--.

Signed and Sealed this

Third Day of October, 1995

BRUCE LEHMAN

Attest:

Attesting Officer    Commissioner of Patents and Trademarks